(12) United States Patent  
Kamada et al.

(10) Patent No.: US 8,233,838 B2  
(45) Date of Patent: *Jul. 31, 2012

(54) BROADCAST PROGRAM SCENE NOTIFICATION SYSTEM

(75) Inventors: Tomihisa Kamada, Tokyo (JP); Yasuyuki Sekiguchi, Aichi (JP); Toshimizu Abiko, Alichi (JP)

(73) Assignee: Access Co., Ltd., Tokyo (JP)

( * ) Notice: Subject to any disclaimer, the term of this patent is extended or adjusted under 35 U.S.C. 154(b) by 782 days.

This patent is subject to a terminal disclaimer.

(21) Appl. No.: 12/274,201

(22) Filed: Nov. 19, 2008

(65) Prior Publication Data

US 2009/0077592 A1    Mar. 19, 2009

Related U.S. Application Data

(63) Continuation of application No. 10/570,314, filed as application No. PCT/JP2004/012164 on Aug. 25, 2004, now Pat. No. 7,457,582.

(30) Foreign Application Priority Data

Aug. 29, 2003  (JP) .................................. 2003-306310

(51) Int. Cl.  
*H04H 1/00*  (2006.01)

(52) U.S. Cl. ...................... 455/3.01; 455/3.06; 455/3.03; 455/414.2; 455/414.3; 725/58; 725/62

(58) Field of Classification Search ................. 455/3.01, 455/3.02, 3.03, 412.1, 412.2, 420, 425, 3.06, 455/414.1, 432.3, 414.2, 414.3, 556.1; 725/58, 725/60, 61, 62, 64, 68, 138, 135, 136, 32; 348/565, 473, 476, 474, 14.01; 709/205; 345/632

See application file for complete search history.

(56) References Cited

U.S. PATENT DOCUMENTS 5,502,497 A * 3/1996 Yamaashi et al. ............. 348/473  
(Continued)

FOREIGN PATENT DOCUMENTS

JP          10-276161 A    10/1998  
(Continued)

OTHER PUBLICATIONS

International Search Report mailed Oct. 19, 2004, for PCT Patent Application No. PCT/JP2004/012164 filed on Aug. 25, 2004, 3 pages.

(Continued)

*Primary Examiner* — Tan Trinh  
(74) *Attorney, Agent, or Firm* — Morrison & Foerster LLP

(57) ABSTRACT

A registration server (40) is connected to a mobile terminal (20) via a communication network (10) and registers desired scene information specifying a desired scene of a user in a broadcast program together with the communication address information (telephone number or mail address or the like) of the mobile terminal (20). A scene management server (42) classifies and manages the scene information on the real scene appearing in the broadcast program. A message transmission server (46) checks whether the real scene corresponds to the desired scene. If it does, the scene management server (42) transmits scene information indicating that broadcast of the desired scene is or has been started via the communication network (10) or the data broadcast to the user, i.e., the mobile terminal (20). In response to the notification of the scene information, the user of the mobile terminal (20) can view the scene substantially in real time by the TV On instruction without performing channel setting.

17 Claims, 29 Drawing Sheets

U.S. PATENT DOCUMENTS

| | | | |
|---|---|---|---|
| 7,457,582 B2 * | 11/2008 | Kamada et al. | 455/3.01 |
| 2003/0097408 A1 | 5/2003 | Kageyama et al. | |
| 2003/0097664 A1 * | 5/2003 | Meyers et al. | 725/138 |
| 2004/0012613 A1 | 1/2004 | Rast | |
| 2005/0033649 A1 | 2/2005 | Okada | |
| 2005/0060757 A1 * | 3/2005 | Suh | 725/135 |
| 2007/0035612 A1 * | 2/2007 | Korneluk et al. | 348/14.01 |
| 2009/0042607 A1 * | 2/2009 | Adachi et al. | 455/556.1 |

FOREIGN PATENT DOCUMENTS

| | | | |
|---|---|---|---|
| JP | 11-187378 A | | 7/1999 |
| JP | 2000-152211 A | | 5/2000 |
| JP | 2000-201338 A | | 7/2000 |
| JP | 2001-283077 A | * | 10/2001 |
| JP | 2001-309263 A | | 11/2001 |
| JP | 2002-232847 A | | 8/2002 |
| JP | 2002-251409 A | | 9/2002 |
| JP | 2003-023617 A | | 1/2003 |
| JP | 2003-069980 A | | 3/2003 |
| JP | 2003-134067 A | | 5/2003 |
| JP | 2003-186431 A | | 7/2003 |

OTHER PUBLICATIONS

International Written Opinion mailed Oct. 19, 2004, for PCT Patent Application No. PCT/JP2004/012164 filed on Aug. 25, 2004, 9 pages.

Chiba, K. et al. (Oct. 1999) "Special Issue on i-mode Service, Digital Mova with Micro Browser," *NTT DoCoMo Technical Journal* 1(1):26-30.

Nikkei Electronics. "Time Has Come for Targeting One-Hour TV Viewing by Cell Phone," (Aug. 18, 2003), pp. 89-95.

Nikkei Electronics. "Pick Up a Desired Scene. Advanced Picture Recorder of Japan Computer Corporation," (Aug. 18, 2003), pp. 28-29.

\* cited by examiner (a)

USER SCENE TABLE
441

| USER ID | PHONE NUMBER | MAIL ADDRESS | DESIRED SCENE ID |
|---|---|---|---|
| USER00001 | 090-1234-XXXX | user1@xxx.ne.jp | SCN005,SCN009 |
| USER00002 | 080-3456-XXXX | user2@xxx.ne.jp | SCN001,SCN103 |
| ⋮ | ⋮ | ⋮ | ⋮ |

(b)

REVERSE RESOLUTION TABLE
442

| DESIRED SCENE ID | USER ID |
|---|---|
| SCN001 | USER00002,USER00005,USER00011, ⋯ |
| SCN002 | USER00012,USER00108,USER02309, ⋯ |
| ⋮ | ⋮ |

FIG.3

SCENE MANAGEMENT TABLE 443a (a) PROGRAM A (EXAMPLE OF LIVE BASEBALL GAME)

| SCENE ID | CORRESPONDING DESIRED SCENE ID | TITLE | CH | START TIME | ENDING TIME |
|---|---|---|---|---|---|
| PSCN001 | SCN0001 | LIVE PRO BASEBALL GAME /TAKAHASHI | 04 | | |
| ⋮ | ⋮ | ⋮ | ⋮ | ⋮ | ⋮ |
| PSCN059 | SNC0100 | LIVE PRO BASEBALL GAME /G vs T FINAL INNING | 04 | | |
| ⋮ | ⋮ | ⋮ | ⋮ | ⋮ | ⋮ |

SCENE MANAGEMENT TABLE 443b (b) PROGRAM B (EXAMPLE OF MUSIC SHOW)

| SCENE ID | CORRESPONDING DESIRED SCENE ID | TITLE | CH | START TIME | ENDING TIME |
|---|---|---|---|---|---|
| PSCN001 | SCN0101 | POPULAR SONGS VARIETY SHOW /JIRO | 01 | 19:15 | 19:20 |
| ⋮ | ⋮ | ⋮ | ⋮ | ⋮ | ⋮ |
| PSCN012 | SNC0100 | POPULAR SONGS VARIETY SHOW /HIROSHI | 01 | 19:35 | 19:40 |
| ⋮ | ⋮ | ⋮ | ⋮ | ⋮ | ⋮ |

FIG. 7

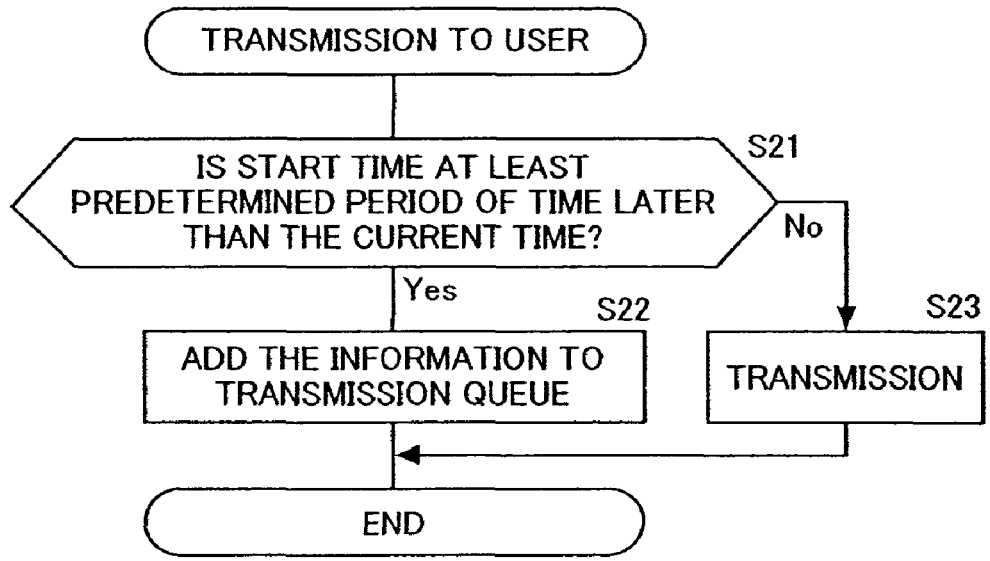
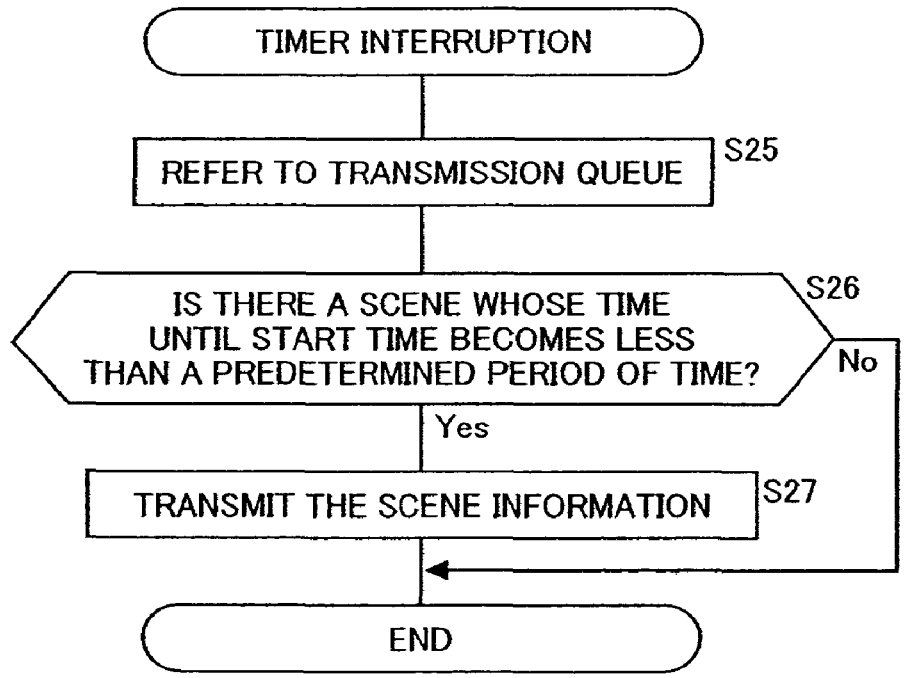
FIG. 9

SCENE ADVERTISEMENT TABLE 550

| SCENE ID | ADVERTISEMENT ID |
|---|---|
| SCN001 | AD00032596 |
| SCN002 | AD00028641, AD00005613 |
| SCN003 | AD00197233 |
| ⋮ | ⋮ |

FIG. 17

(a)
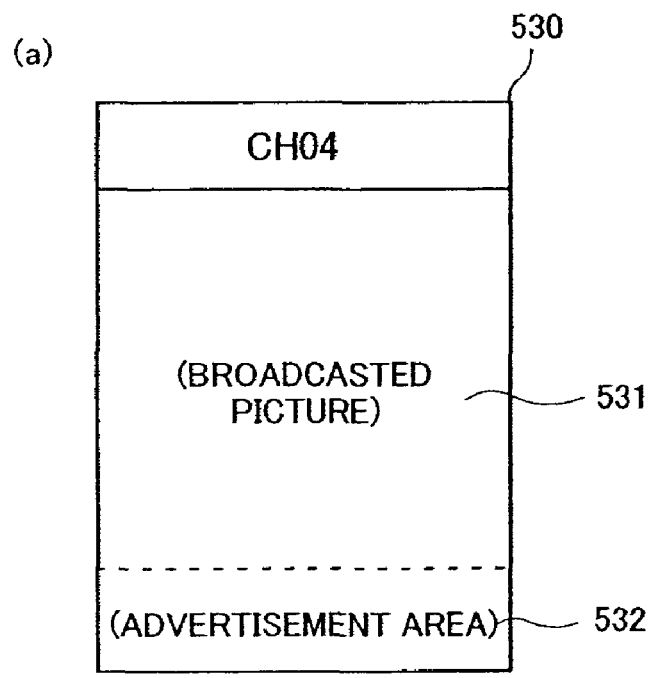
(b)
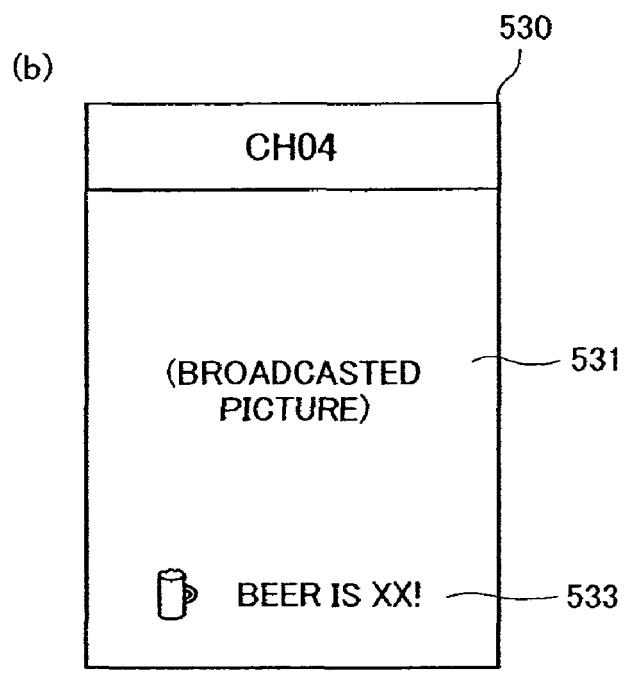
FIG. 18

BROADCAST PROGRAM SCENE NOTIFICATION SYSTEM

TECHNICAL FIELD

The present invention relates to a system which notifies substantially in real time a start of broadcasting a scene in a broadcast program, to a terminal device with a capability of receiving/reproducing TV broadcast.

BACKGROUND ART

Nowadays, there has been announced a cell phone having a capability to receive terrestrial digital TV broadcasting (see Non-patent Document 1). With this technique, a user having this cell phone is allowed to view a TV program from away home, at any desired point of time.

Patent Document 1 discloses a technique in which a broadcast station announces a user of broadcast programs via an announcement program or the like, receives from the user a registration of a program which the user desires to view, and transmits a noticing mail which is addressed to each of all the users who have carried out a registration as to the program, on the previous day or before of the program broadcasting date. This is effective to prevent the user from forgetting about viewing the desired program.

Patent Document 1: Japanese Patent Laid-open Publication No. 2003-134067

Non-patent Document 1: "Time has come for targeting one-hour TV viewing by cell phone", Nikkei Electronics, Vol. 2003.8.18, pp. 89-95

Non-patent Document 2: "Pick up a desired scene, Advanced picture recorder of Japan Computer Corporation", Nikkei Electronics, Vol. 2003.8.18, pp. 28-29

Non-patent Document 3: "Special Issue on i-mode Service Digital Mova with Micro Browser", NTT DoCoMo Technical Journal Vol. 1, No. 1, p. 28

DISCLOSURE OF THE INVENTION

Problems to be Solved by the Invention

It seems rare, however, for a user of a mobile terminal device (hereinafter, simply referred to as "mobile terminal") such as a cell phone, to make a long-time continuous viewing of TV broadcast programs, unlike with a fixed TV set at home, due to the factors such as being in-transit situation of the mobile terminal and changing status of incoming radio wave, or from the viewpoint of battery remaining amount.

It is rather expected that a general viewing style of TV broadcast using a mobile terminal is to view only a part of program, not by a unit of broadcast program, that is, only a specific scene of interest to a user within the program. By way of example, this style may be viewing only a short period of time such as a scene of one's favorite player being at-bat within a live broadcast of baseball game, a scene of sumo tournament showing a match of one's favorite sumo wrestler, and a scene of a singer appearing in a music show, who is of interest to a user. However, even though the user knows that there is a desired scene within a program, it is usually unclear at what time within the program the target scene will begin to air. Furthermore, the user may be unaware that the program itself exists, which contains such desired scene.

In conjunction with the problems as mentioned above, Non-patent Document 2 discloses a digital recorder or a home server, being provided with a high capacity hard disk, which includes following functions: Top five topics having longer broadcasted time within one day with regard to programs such as news programs and tabloid shows, or related scenes in a specific news program corresponding to a keyword selected by a user, are extracted and reproduced from data having been recorded. With this technique, it is possible to selectively view only a scene of one part of the program. In this technique, however, amass-storage system is necessary because a plurality of target programs should be once recorded entirely. Therefore, this technique can be hardly employed by a mobile terminal. Even if it is applicable to the mobile terminal, viewing a scene according to this technique is possible with the function of so-called "time shift", and it does not satisfy a user who wants to view a program in real time, such as live broadcast of sports program.

The present invention has been made considering the background as described above, and its object is to provide a method, apparatus, system and computer program, regarding a service which makes a scene notification to a user, so that the user is allowed to view a desired scene within a broadcast program substantially in real time.

Another object of the present invention is to provide a method and system which deliver advertisement information along with the scene notification.

Further alternative object of the present invention is to provide a system to obtain audience information along with the scene notification.

Means for Solving the Problem

A broadcast program scene notification method according to the present invention is a method to make a broadcast program scene notification to a terminal device having data communication capability and broadcast receiving/reproducing capability, the method comprising the steps of:

registering desired scene information specifying a desired scene within a broadcast program, the scene being desired by a user at the terminal device, together with communication address information of the terminal device, classifying and managing scene information as to a real scene appearing in the broadcast program, checking whether or not the real scene corresponds to the desired scene, and transmitting to the user's terminal device, scene information indicating for the user that broadcast of the desired scene is going to start or has started, when it is determined that the real scene corresponds to the desired scene, wherein a start of the broadcast program scene is notified substantially in real time.

In this broadcast program scene notification method, the user registers in advance one's desired scene in the broadcast program, and when a real scene in the program corresponds to the desired scene, the user is allowed to receive a notification indicating that the desired program is going to start or has started, substantially in real time at the time of the real scene occurrence. Therefore, the user is allowed to view in real time the real scene on the air, which corresponds to his or her desired scene. It is to be noted here that the expression of "substantially in real time" considers a delay in notification which is made after confirming the start of the real scene.

Classification and management of the scene information as to the real scene appearing in the broadcast program, may be performed just before or after the real scene occurrence while the program is on the air, or it may be performed as a schedule preceding the start of the program broadcasting.

The scene information may include channel information indicating a channel through which the scene is put on the air, and also includes at least one of the followings: title information of the scene to be notified and start time of the scene. The channel information is utilized for setting a channel on the terminal device. The title information and the start time of the scene are displayed on the terminal device, and it is useful for the user to be aware what kind of scene it is and what time the scene starts. If the start time is included, it is also possible to additionally include an ending time or a duration time.

Transmission of the scene information is performed by any one of the followings: a message communication utilizing a phone number as the communication address information, mail communication utilizing an E-mail address as the communication address information, and data broadcast including user identification information.

It is further possible to provide a step of adding advertisement information to the scene information to be broadcasted and broadcasting the scene information with the advertisement information, in response to a notification of broadcasting start of the broadcast program scene. Alternatively, it is further possible to provide a step of transmitting the advertisement information via data communication in accordance with broadcasting the scene, in response to the notification of the broadcasting start of the broadcast program scene.

A broadcast program scene notification system according to the present invention is a system to make a broadcast program scene notification to a terminal device having data communication capability and broadcast receiving/reproducing capability, comprising:

a registering means which is connected to the terminal device via a communication network, and registers desired scene information specifying a desired scene of a user within a broadcast program, together with communication address information of the terminal device;

a managing means which classifies and manages scene information as to real scene appearing in the broadcast program; and a scene information transmitting means which checks whether or not the real scene corresponds to the desired scene, and transmits to the user's terminal device via the communication network, scene information indicating that broadcasting the desired scene is going to start or has started for the user, when it is determined that the real scene corresponds to the desired scene, wherein the scene information transmitting means notifies a start of broadcast program scene substantially in real time.

In this system, the registering means is connected to the terminal device via the communication network, and registers desired scene information specifying the user's desired scene within the broadcast program, together with the communication address information of the terminal device. The managing means classifies and manages the scene information of the real scene appearing in the broadcast program. The scene information transmitting means checks whether or not the real scene corresponds to the desired scene, and if it does, the scene information transmitting means transmits via the communication network to the user's terminal device, the scene information indicating that broadcasting of the desired scene is going to start or has started, thereby notifying a start of broadcast program scene substantially in real time.

The registering means has, as one aspect thereof, a user scene correspondence table in which a user on the terminal device is associated with desired scene ID information. Based on the table contents, it is possible to determine a user to whom each real scene should be notified.

As one aspect, the management means has a scene management table in which each real scene is associated with at least corresponding desired scene ID information and scene title information. With this table, it is possible to determine and store attributes of each real scene.

In addition, this scene management table may include channel information and start time information of the program with respect to the real scene.

The system may also be provided with an audience status checking server. This audience status checking server receives from each terminal device, audience information including at least an information item indicating that broadcast receiving/reproducing capability has been turned on, in response to the notification of the broadcast program scene, and checks a status of viewing or listening. The audience information may further include, any of the following information items; a point of time when the broadcast receiving/reproducing capability was turned ON, when it was turned OFF, a period of time from ON to OFF, scene information having been notified, channel change information, channel change time, and scene notification opened information notifying that the scene notification was opened.

The present invention may also be taken as a computer program which makes a broadcast program scene notification to a terminal device having a data communication capability and broadcast receiving/reproducing capability.

The terminal device according to the present invention features that it is provided with a broadcast receiving/reproducing means which receives/reproduces broadcasting, a data receiving means which receives data including the channel information of the broadcast program, a channel data extracting means which extracts the channel information thus received, a startup means which sets a receiving channel of the broadcast receiving/reproducing means based on the channel information thus extracted, and starts the broadcast receiving/reproducing means.

In this terminal device, the data receiving means receives data including the channel information of the broadcast program, and the channel data extracting means extracts the channel information thus received. Subsequently, the startup means sets a receiving channel of the broadcast receiving/reproducing means based on the channel information thus extracted, and starts up the broadcast receiving/reproducing means. It is to be noted here that the startup means is capable of performing this startup automatically, but it is preferable to start up in response to a user's instruction.

The present invention may also be taken as a computer program which is executed on the terminal device having a data communication capability and broadcast receiving/reproducing capability.

Effect of the Invention

According to the present invention, a user is allowed to be aware of broadcast start of a user's desired scene within a broadcast program substantially in real time, thereby allowing the user to view or listen the scene without missing it. Even a live program can be viewed or listened substantially in real time. It is not necessary for the user to recognize in advance a program including the scene, nor to designate the program either.

As for a broadcast station, even with piecemeal viewing or listening, an improvement in audience rating of the program can be expected. Advertisement information can be added in such a manner as being associated with a scene, and audiences of individual program scenes can be estimated according to the number of users as destinations for delivering the scenes respectively. Therefore, advertising value can be enhanced as to the scene having a large number of delivery destinations, and an advertising agency is allowed to set a counter value to the advertisement information delivery, with respect to each scene, separately from the advertisement in the normal broadcast.

BRIEF DESCRIPTION OF DRAWINGS

FIG. 3 includes illustrations showing configuration examples of user scene table and reverse resolution table, which are stored in user scene information DB used in an embodiment of the present invention.

FIG. 7 includes illustrations of scene management tables prepared in advance respectively for individual programs as targets of the scene notification service, according to an embodiment of the present invention.

FIG. 9 includes a flowchart of the transmission process in step S16 of FIG. 8, and a flowchart of timer interrupt process regarding transmission queue.

FIG. 17 is an illustration showing a configuration example of the scene advertisement table stored in the advertisement DB together with advertisement information according to another embodiment of the present invention.

FIG. 18 includes illustrations showing an advertisement area within the display screen, and a specific example of text information displayed in such a manner as running through the advertisement area, according to another embodiment of the present invention.

DESCRIPTION OF THE MARKS

10 . . . NETWORK, 20 . . . MOBILE TERMINAL (TERMINAL DEVICE), 30 . . . BROADCAST STATION, 40 . . . REGISTRATION SERVER, 42 . . . SCENE MANAGEMENT SERVER, 44 . . . USER SCENE INFORMATION DATABASE, 46 . . . MESSAGE TRANSMISSION SERVER, 47 . . . MESSAGE BOX, 50 . . . ADVERTISEMENT SERVER, 52 . . . ADVERTISEMENT DATABASE, 61 . . . AUDIENCE STATUS CHECKING SERVER, 62 . . . AUTHENTICATION SERVER, 63 . . . PROGRAM TABLE, 201 . . . CENTRAL CONTROL UNIT, 204 . . . DISPLAY CONTROL UNIT, 205 . . . DISPLAY UNIT, 206 . . . COMMUNICATION UNIT, 207 . . . OPERATION UNIT, 208 . . . FLASH MEMORY, 210 . . . BUS, 211 . . . ANTENNA, 212 . . . TV SIGNAL RECEIVER, 213 . . . AUDIO PROCESSOR, 214 . . . MICROPHONE, 215 . . . SPEAKER, 441 . . . USER SCENE TABLE, 442 . . . REVERSE RESOLUTION TABLE, 443 . . . SCENE MANAGEMENT TABLE

BEST MODE FOR CARRYING OUT THE INVENTION

Hereinafter, preferred embodiments of the present invention will be explained.

Figure 1:
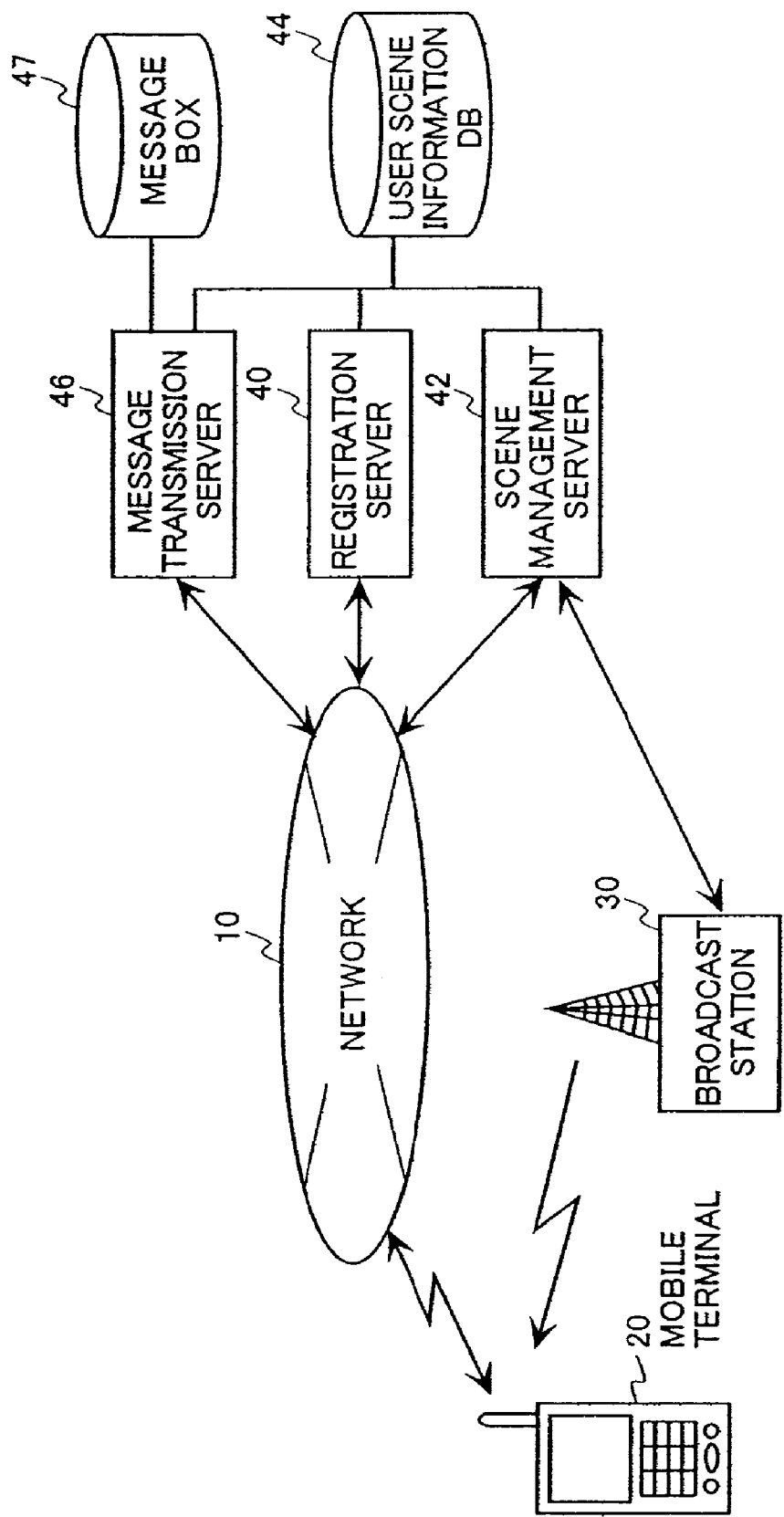
FIG. 1 is a diagram showing a schematic configuration of broadcast program scene notification system according to the present invention.

FIG. 1 shows a schematic configuration of broadcast program scene notification system according to the present invention. The term "program scene" or "scene" in the present specification denotes an arbitrary part of a broadcast program, and by way of example, it indicates a series of portions including as contents, a person, an item, a scene, and the like, which are guessed to be desired by a user for viewing.

This system comprises a mobile terminal 20 such as a cell phone having a TV broadcast receiving capability, broadcast station 30 which broadcasts a TV program, various servers (registration server 40, scene management server 42, and message transmission server 46) which perform processing relating to a program scene in the present embodiment, and communication network 10 including cell phone network, packet network, the Internet, and the like.

The registration server 40 is a server which performs a process for registering a user and a desired scene, in response to an application from the user who enjoys the broadcast program scene notification service. The scene management server 42 is a server which stores and manages various attribute information as to real scenes within the broadcast program. Here, the term "real scene" depicts a scene as opposed to a conceptual "desired scene", and it is a specific scene which has actually occurred (or is scheduled to occur) in the program.

The registration server 40, the scene management server 42, and the message transmission server 46 share the user scene information database (DB) 44.

The message transmission server 46 is connected to message box 47 which temporarily stores a message to be transmitted, and transmits the message to the mobile terminal 20 at a predetermined point of time, via the network 10. In the present specification, as far as not explicitly stated, the term "message" is assumed to contain a relatively short message, so-called "short message", which is transferred using a phone number as communication address information, and E-mail (also simply referred to as "mail") which is transferred using an E-mail address as communication address information.

The scene management server 42 is connected to the broadcast station 30, so as to receive an input of information as to a program or a scene. Here, the connection mode is assumed as using an exclusive line, but the connection may be established via the network 10.

Typically, the mobile terminal 20 is a cell phone, but it may include PDA (Personal Digital Assistant), game machine, vehicle navigation device, and the like, as far as provided with data communication capability and broadcast receiving/reproducing capability.

The network 10 includes, though not illustrated, a message server which performs intermediate processing for transferring short messages, or a mail server which performs intermediate processing for transferring E-mails. It is assumed here that the registration server 40, the scene management server 42, and the message transmission server 46 are installed on the same place, but they are not necessarily placed at the identical location. Furthermore, the location may be different from or the same as the position of the broadcast station 30. Contents of the user scene information DB 44 and operations of respective parts shown in FIG. 1 will be described below. The broadcast by the broadcast station 30 is assumed as terrestrial digital broadcasting, but the present invention can also be applied to satellite broadcasting, or analogue broadcasting.

Figure 2:
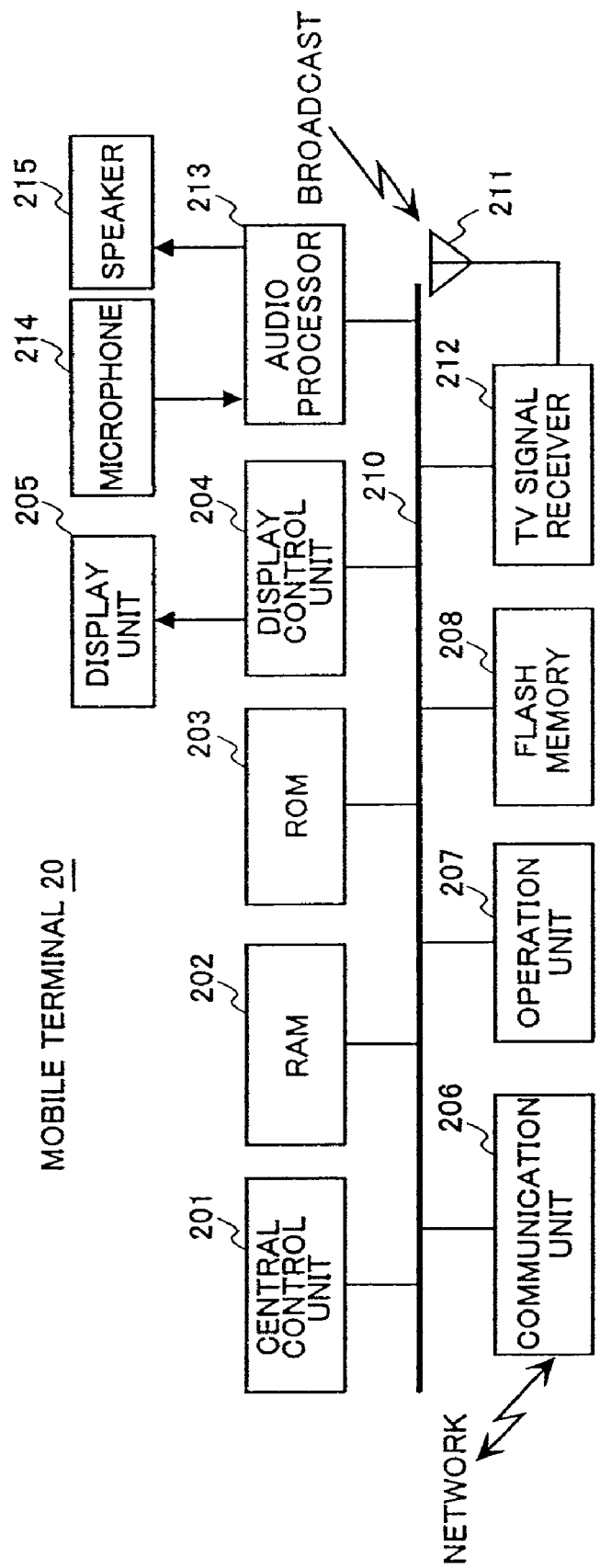
FIG. 2 is a diagram showing a schematic hardware configuration of the mobile terminal which is shown in FIG. 1.

FIG. 2 is a schematic hardware configuration example of the mobile terminal 20. This TV unit comprises central control unit 201, RAM 202, ROM 203, display control unit 204, display unit 205, communication unit 206, operation unit 207, flash memory 208, antenna 211, TV signal receiver 212, audio processor 213, microphone 214, and speaker 215.

The central control unit 201, RAM 202, ROM 203, display control unit 204, communication unit 206, operation unit 208, flash memory 208, TV signal receiver 212, and audio processor 213 are connected to the bus 210, and data exchange, command sending/receiving, and the like are mutually performed by way of this bus 210.

The RAM 202 is a memory which temporarily holds and stores an operation result from the central control unit 201 and data (including mail) which are obtained from the outside. The ROM 203 is non-volatile memory which stores operating system (OS) and various programs. The central control unit 201 reads out those programs from the ROM 203, and executes a predetermined processing according to the programs. The flash memory 208 is a rewritable non-volatile memory for holding information such as data, mail addresses, and URLs, obtained from the outside, which are to be processed subsequently.

The communication unit 206 has a function which establishes connection with the network 10 and performs sending/receiving data to/from the network 10. The operation unit 207 has ten keys and various command keys, and provides input interface to a user.

The display control unit 204 has functions to receive display information such as text and image from the central control unit 201, and to drive the display unit 205 based on this display information. As display information from the outside, both information by way of the network and information by broadcasting are displayed in such a manner as switching one to another, or superposing one on another. The display unit 205 includes an arbitrary display device such as liquid crystal device, organic EL device, and has a function to optically display an image according to drive signals from the display control unit 204.

The TV signal receiver 212 has functions to extract a desired channel signal from the broadcast wave received by the antenna 211, and to demodulate/reproduce the signal. The TV signal receiver 212 may include a browser function which interprets and displays the text described in BML (Broadcast Markup Language) language in digital broadcasting. The audio processor 213 performs processing to allow the speaker 215 to output voice and sound and to convert the voice and sound inputted from the microphone 214 into a predetermined signal. The TV signal receiver 212 may include broadcasted picture recording means. The RAM 202 or the flash memory 208 may serve as storage for picture recording.

Configurations of the registration server 40 and the scene management server 42 are not illustrated, but both are computer systems, each being provided with central control unit, communication unit, storage device, and various I/O devices.

FIG. 3 includes illustrations showing configuration examples of user scene table 441 and reverse resolution table 442 stored in the user scene information DB 44 which is used according to an embodiment of the present invention. The user scene table 441 is a data table which registers communication address information (in this example, phone number and mail address) and a desired scene ID as scene identification information to identify a desired scene, with respect to each registered user enjoying the broadcast program scene notification service according to the present embodiment. This registration site is provided on a web site, and as described below, a user is allowed to go through procedure for registering the user and his/her desired scene, on this web page. If the scene notification is made only by short message, a column of mail address is not necessary in the user scene table 441. On the other hand, if the scene notification is made only by E-mail, a column of phone number is not necessary.

Here, it is to be noted that the phone number of the user is managed by the cell phone carrier side and it is possible for the server to identify the cell phone number based on unique ID (terminal ID) information transmitted from the cell phone. If correspondences between the unique ID information and the cell phone numbers are unclear on the server side, it is possible to notify the unique ID information to the cell phone carrier at the time of scene notification by a short message, and to request a conversion of the unique ID information into a corresponding phone number. The unique ID in such a case above is also assumed as one type of communication address information according to the present invention. The mail address is also managed by the cell phone carrier, in such a manner as being associated with the cell phone number. Therefore, similar to the case above, the mail address is able to be identified on the server side based on the unique ID information. However, it is also possible to allow the user to input the mail address.

The reverse resolution table 442 is a data table generated from the user scene table 441, and the user IDs of users who desire a scene are collectively registered with respect to each desired scene ID. This table is updated every time when the user scene table 441 is updated. It is to be noted that if a user as a target of notification is retrieved from the user scene table 441 every time when a scene to be notified occurs, the reverse resolution table 442 is not necessary. However, if the reverse resolution table 442 is prepared in advance, search-process time can be reduced.

Hereinafter, operations of the present embodiment will be explained. Those operations are roughly categorized into the following stages: registration stage to register a desired scene as to which the user expects to receive a notification, management stage to manage the scene information by classifying the scenes appearing in the broadcast program, notification stage to notify the user of the scene information of a real scene corresponding to the desired scene, and viewing stage in which the user views the broadcast program scene based on the received scene information.

Figure 4:
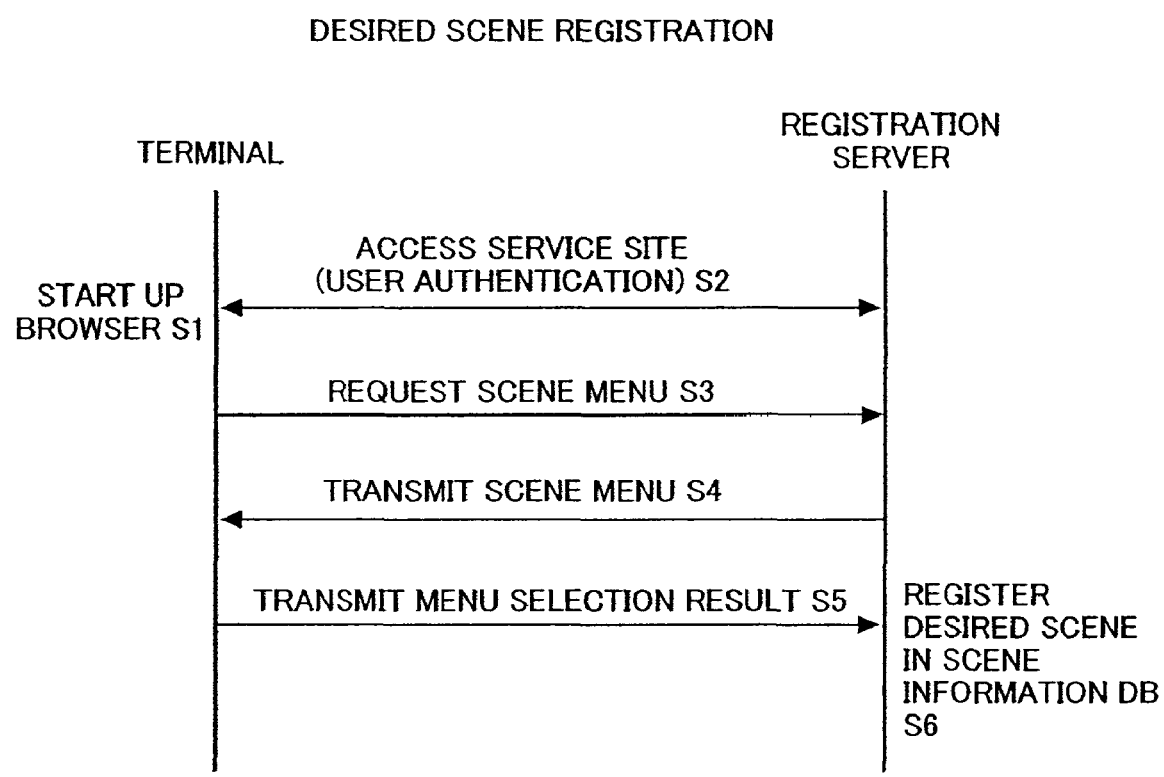
FIG. 4 is a sequence diagram showing a process between the terminal and the scene registration server, at the stage of registering a desired scene as to which a user desires to receive a notification, according to an embodiment of the present invention.

FIG. 4 shows a process between the terminal and the scene registration server at the registration stage for registering a desired scene as to which a user expects a notification. The terminal starts up the web browser (S1), and accesses the scene registration server on the site which performs the scene notification service according to the present embodiment (S2). In response to a scene menu request (S3) from the user, the server transmits the scene menu to the terminal (S4). When the user selects a desired scene from the scene menu, the selection result is transmitted to the server (S5). The server updates the contents of the user scene information DB 44 based on the selection result thus received (S6).

It is to be noted here at the time of initial user registration, the user information (and password, if required) is registered. Once the user password is registered, the user is prompted to input the password in step S2 mentioned above, thereby authenticating the user.

Figure 5:
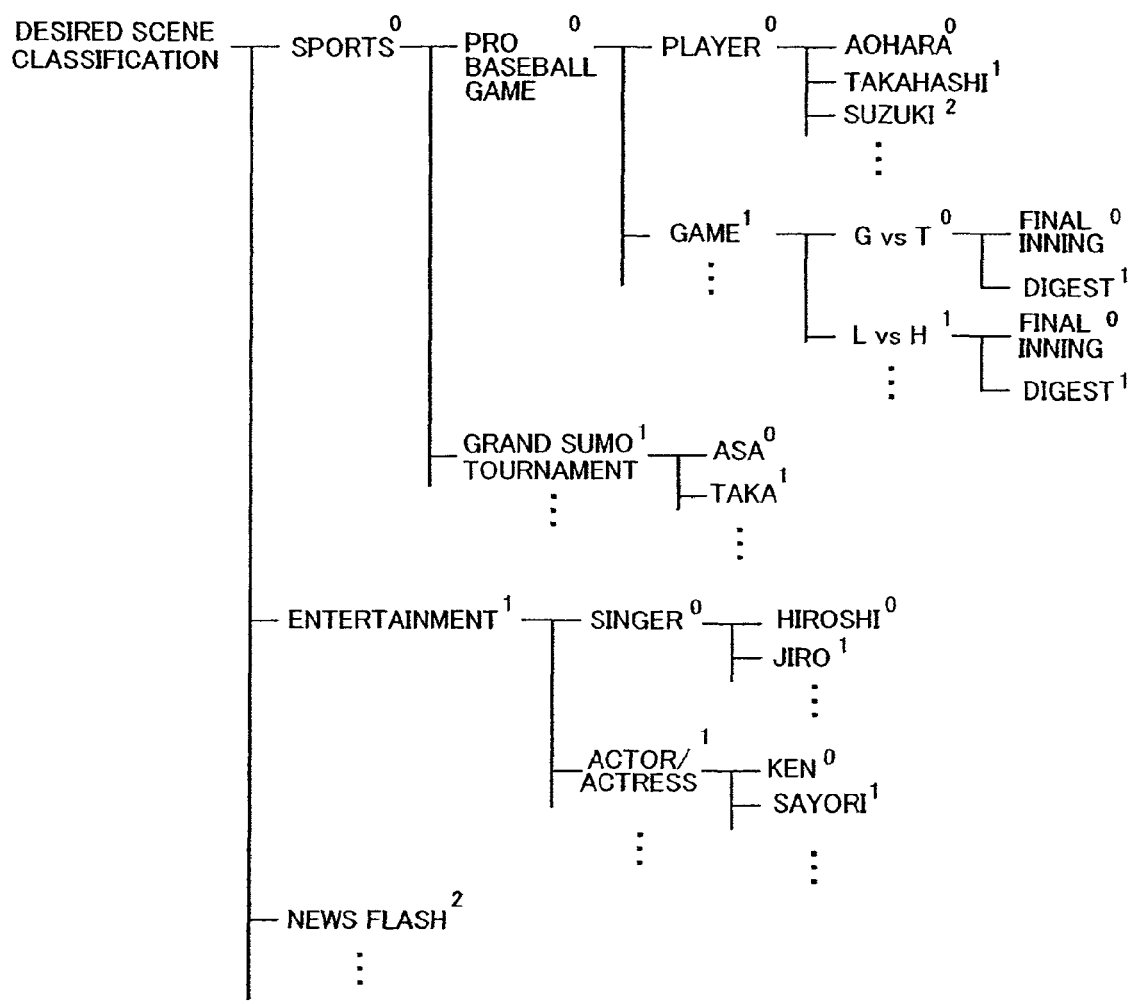
FIG. 5 is an illustration showing an example of hierarchical classification as to the desired scenes prepared in advance, according to an embodiment of the present invention.

FIG. 5 shows a hierarchical classification as to the desired scenes prepared in advance. Those desired scenes are classified and listed according to genre or the like, which are guessed to be desired for viewing by relatively large number of users. The number on the right shoulder of each item in the hierarchy denotes digit value of classification code. String of numbers obtained by tracing the numbers from the uppermost layer to subsequent lower layers sequentially functions as the classification code. In the example as shown in FIG. 5, the classification code for "G vs T, final inning" is "00100". There are assumed cases, such as a situation desiring to view an at-bat status of a particular player in a game of professional baseball, a situation desiring to view a final inning or only a digest of a game between specific teams, a situation desiring to view a match of a favorite sumo wrestler, a situation desiring to view a result of soccer game, a situation desiring to view a specific singer appearing on stage in a music show, a situation desiring to view a scene where a specific actor or actress appears in a drama or the like, and a situation desiring to view a news bulletin. Classification has been made by genre so far, but it is also possible to sort on unit of program in a particular broadcast station, and prompt the user to select an actor or specific scene, in each program.

Figure 6:
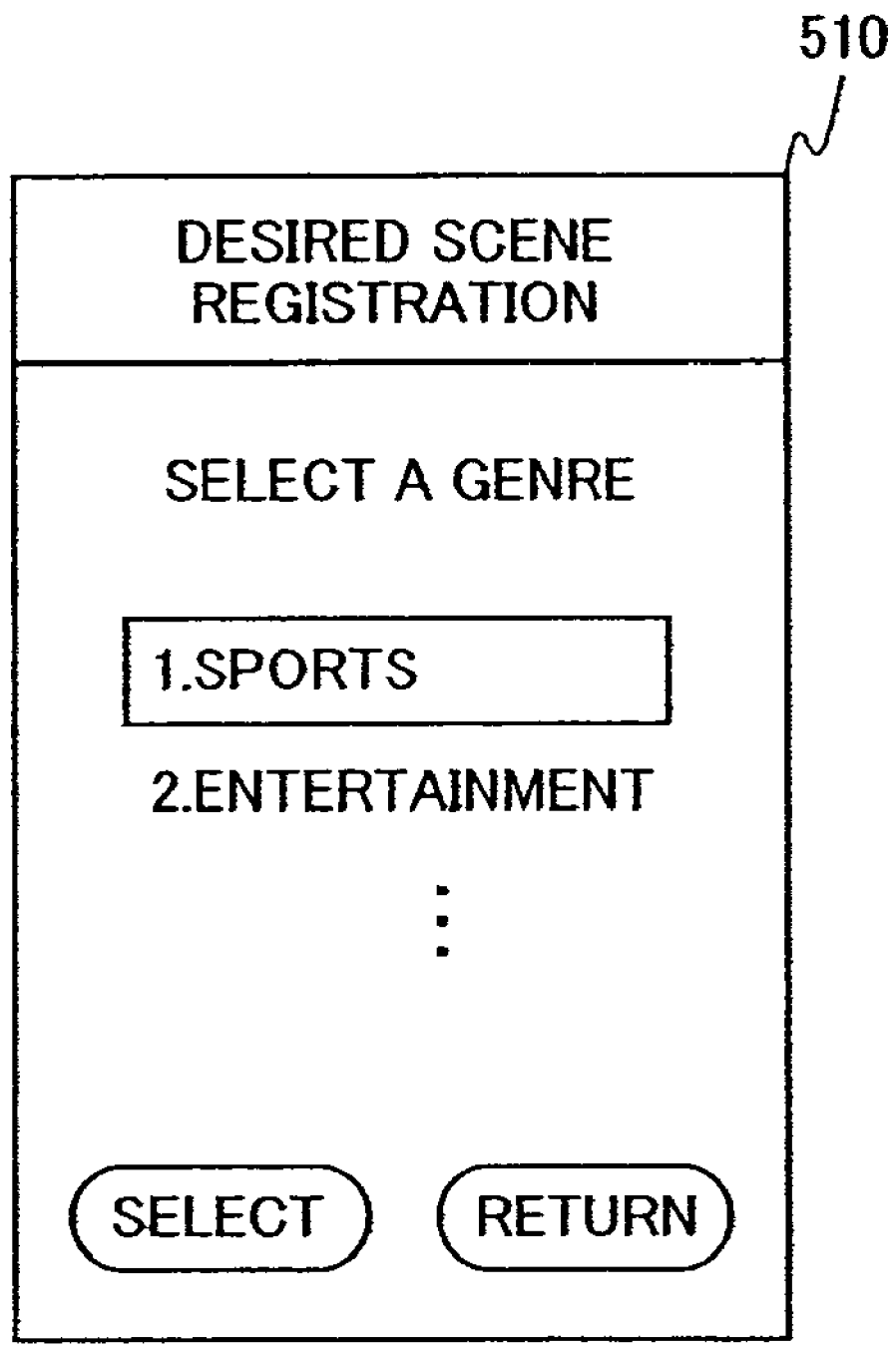
FIG. 6 is an illustration showing a screen example of the mobile terminal at the time when a desired scene is registered according to an embodiment of the present invention.

FIG. 6 shows a screen example 510 on the mobile terminal at the time of registering a desired scene. This screen prompts the user to select a menu item sequentially from the uppermost layer in the desired scene classification as shown in FIG. 5. This screen is switched sequentially for selecting items in the lower layers, but illustrations of the subsequent screen examples are omitted. If there are multiple desired scenes, the registration process is performed repeatedly.

Next, the management stage which manages scene information by classifying the scenes appearing in the broadcast program will be explained. In the present embodiment, it is assumed that an operator decides whether or not a scene has occurred in the program, information of which is to be extracted, and further decides attributes of the scene (genre, title, and the like of the scene). The results of the decision are registered in the user scene information DB 44 from the scene management server.

In implementing the scene notification service, there are a few differences in procedures between a situation of live program and a situation of recorded program.

If the program is recorded program, it is possible to check in advance whether or not there exists a desired scene and the time of occurrence if it exists. Therefore, scene information of various scenes can be registered beforehand. In this situation, if individual scenes in the program of digital broadcast are added with information for identifying each scene, it is possible to automatically obtain the scene information based on thus added information.

On the other hand, if the program is live program, occurrence of a desired scene and the time of occurrence are indefinite. As to a certain type of desired scenes, it may be possible to predict to some extent, each occurrence of the scene and time of occurrence. For example, in a live music show program, its schedule is predetermined, and thus it is possible to predict an appearance of a singer at a certain point of time, with a high degree of accuracy. In this situation, scene information can be inputted as predictive data (At the time of the service-use registration, a prior approval from the user is obtained regarding the possibility that the scene information generated by prediction may not correspond to the reality). Generally, it is difficult to predict the occurrence time of an at-bat scene of a particular baseball player, for instance. Therefore, according to the announcement as to the player's at-bat, the operator inputs the scene information in real time.

Notification of a scene of an event, whose occurrence timing is unpredictable, such as occurrence of a home run in a baseball game, cannot be made in advance. However, it is possible to handle this situation as the following, so as to allow the scene notification to be behind the actual event occurrence. In other words, as to the scene notification information of the scene broadcasted just before, channel information, broadcast start date and time, and information for instructing a start of recorded data reproduction, are included therein, and a recording means is provided on the terminal side, which has a function of overwrite recording for continuously overwriting only the latest portion of the received broadcast program, the portion corresponding to a predetermined period of time. With the procedure as described above, reproduction of the target scene on the channel in the already-recorded information can be started. If there is a channel fixed for this service, it is not necessary to include the channel information into the scene notification information. Furthermore, if ending date and time for broadcasting the scene are included, it is possible to automatically stop reproducing the scene after the start of reproduction. As a method for recording the broadcast, a predetermined action mode is selected, and continuous recording of the broadcast information on the channel targeted for this service is performed for a predetermined period of time. The target channel can be designated in advance by the user. However, it is to be noted that data storage capacity on the mobile terminal is limited. Therefore, this method is configured such that recording is continued considering a predetermined period of time (or a predetermined volume) as a limit, and upon reaching the uppermost limit, older data is overwritten. Accordingly, it is possible to constantly retain past broadcast information corresponding to a predetermined period of time just prior to the current time. Upon receipt of a notification of such already broadcasted scene, recording is stopped. With such a configuration as described above, it is possible to hold past broadcast data, for example, around five minutes prior to the current time, and after the occurrence of the scene, the past broadcast data can be reproduced and confirmed. It is not real time in the strict sense, but since the elapsed time is limited short time, it can be regarded as substantially in real time. Here, it is to be noted that, in general, the term "overwrite" denotes writing in such a manner as covering old data with writing, but the present invention is not necessarily limited to this way of mode. For example, the present invention includes another way of mode in which new data is written in a new storage area and old data is erased. In addition, continuous recording may cause a problem in battery consumption. Therefore, it is possible to configure such that the user is allowed to turn the operation mode ON/OFF manually so as to limit the time of the operation mode of recording to a predetermined length, or this operation mode is automatically turned OFF after a lapse of predetermined period set by a timer, from the time when this operation mode is turned ON. Alternatively, it is further possible to automatically turn this operation mode ON for a period designated in advance by setting the timer on the terminal. As a further alternative, the message transmission server 46 may perform push-based delivery of a message which instructs the terminal to shift to this operation mode. For example, the user registers in advance a program he or she desires, its channel, time zone, and the like, in the registration server 40, whereby the message transmission server 46 is allowed to transmit to the user a message instructing to shift to the operation mode at the timing corresponding to the registered data. The mobile terminal, which has received the message as described above, interprets the message and is allowed to shift to the operation mode automatically. Here, the term "automatically" includes a situation where shifting is carried out without involving the user, and a situation where shifting is carried out in response to the instruction from the user who has recognized the message.

FIGS. 7(*a*) and (*b*) are scene management tables 443*a* and 443*b* (collectively referred to as "443"), which are prepared with respect to each program as a target of the scene notification service. In the present embodiment, those tables are also stored in the scene information DB 44. The scene management table 443 includes following items: "scene ID" which is to identify each scene within the program, "desired scene ID" corresponding to this scene (associated with the classification code in FIG. 5), "title" of the scene as scene identification information recognizable by the user, "broadcast channel (CH)", "start time" and "ending time" of the scene. It is to be noted that instead of the ending time, duration time may be employed, which is a time period from the start to the end of the scene.

FIG. 7(*a*) shows a scene management table 443*a* regarding a live broadcasting program of baseball game. In this case, as a nature of the program, it is not known until immediately before the real at-bat scene, when the at-bat scene of a particular player will be broadcasted. Therefore, sequential scene information is generated based on the operator's manipulation at a predetermined point of time after the start of the program. For example, as for the scene ID, serial numbers are created in the order of generating the scene information. The desired scene ID is determined according to the instruction from the operator (for example, by selecting a menu item and a button). As for the title, in this example, a combination of the title of the program and the name of the desired scene is automatically created. "CH" is the channel number on which this program is broadcasted. The start time becomes a past point of time if the scene information is inputted after confirming the occurrence of the scene. However, if the immediately precedent broadcast is not recorded, it is not possible for the user to view a past portion of broadcasted scene having already gone, and thus the start time in this case may be set as the current time. Furthermore, if it is deemed certain that the scene will occur and the time of occurrence can be predicted, the start time can be determined by inputting the predicted time by an operator (for example, several tens of seconds later or several minutes later, or the like). In this example, the column of the ending time is kept blank. For example, if the broadcast time of a digest of live baseball game is decided in advance, the scene information may be generated including the scheduled start time and ending time of the scene. In FIG. 7(*b*) showing the scene management table 443*b* regarding a music show of live broadcast, if it is predictable in advance what kind of scene may occur and what time the scene occurs and ends, those scene information items can be preset. On the other hand, if it is not predictable, an operator performs inputting operations just before or just after the scene occurrence.

Next, the notification stage will be explained, which notifies the user of scene information of the real scene corresponding to the desired scene.

Figure 8:
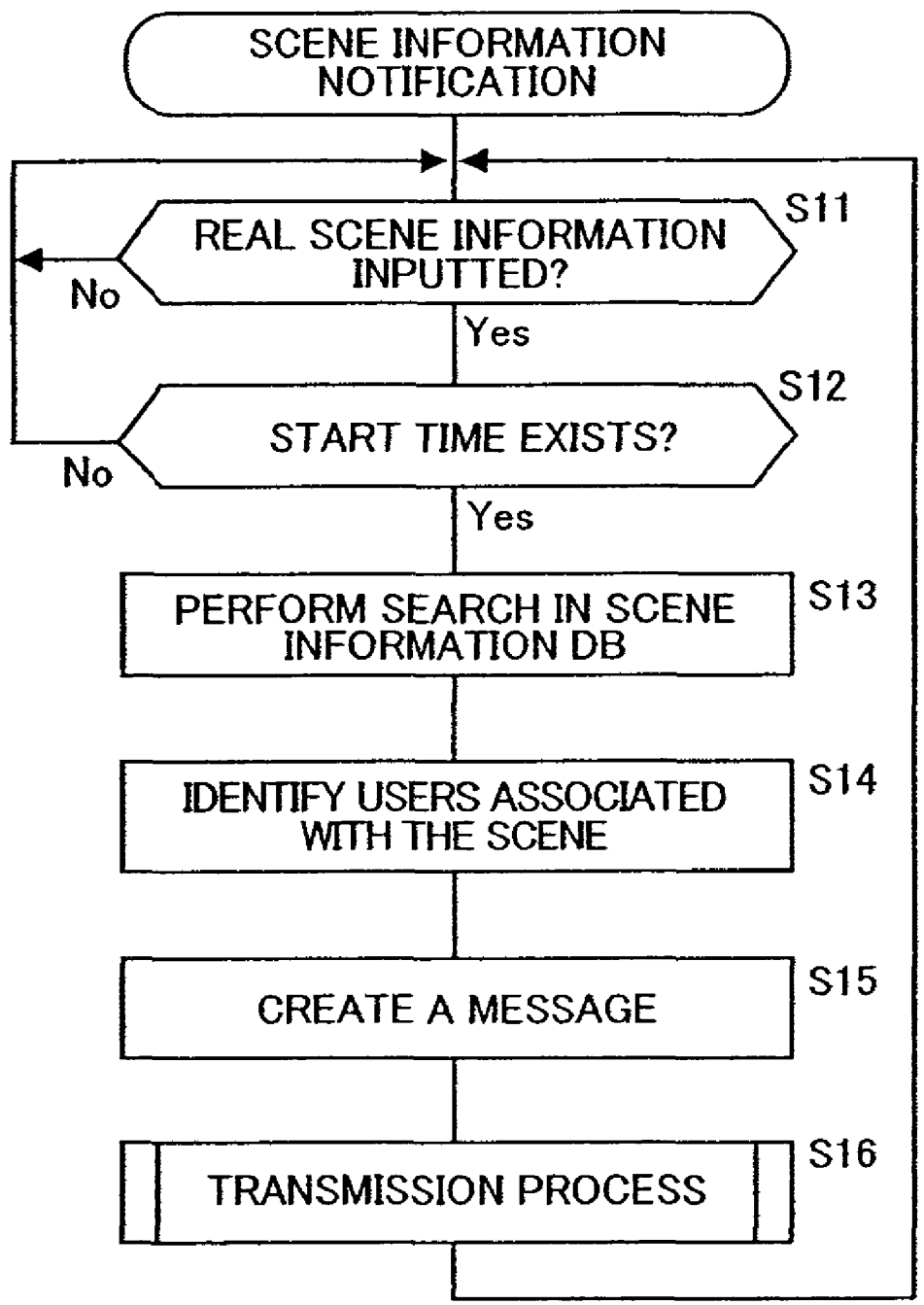
FIG. 8 is a flowchart showing a process of scene information notification which is executed by message transmission server, according to an embodiment of the present invention.

FIG. 8 is a flowchart of the scene information notification process executed by the message transmission server 46. If real scene information is inputted according to an operator's manipulation or the like (S11, Yes) and the start time of the scene is inputted (S12, Yes), search in the scene information DB 44 is performed (S13). Otherwise, the process returns to step S11. According to the search of the user scene information DB 44, users associated with the scene (who desires a notification) are identified (S14). Then, a message notifying the scene information is created (S15). This message is temporarily stored in the message box 47 (FIG. 1). The details of the scene information to be notified typically includes, scene title information, broadcast CH information, broadcast start time, and broadcast ending time. Subsequently, processing for transmitting the scene information to the users is performed (S16).

FIG. 9(a) shows a detailed description of the transmission process in step S16 as shown in FIG. 8. Firstly, it is checked whether or not the start time of the scene is the time at least a predetermined period of time later than the current time (for example, at least a few minutes later than the current time) (S21). If the result is "Yes", this scene information is added to a queue (S22). If the result is "No", the scene information is immediately transmitted to the user by a short message or by a mail (S23). The queue is obtained by joining pointers of the scene information items, though not particularly illustrated. Preferably, the scene information items are sorted in the queue by the start time. The case where the result of judgment in step S21 is "No" includes a situation that the start time of the scene is already the past time. It is to be noted that judgment in step S21 can be made based on the scene management table 443, as far as it is kept track of whether or not the notification has already been made. Therefore, the transmission queue is not an essential element in the present invention.

FIG. 9(b) shows a timer interrupting process with regard to the transmission queue. This process is started up on a periodic basis. This period is set to several seconds, several tens of seconds, or one minute or less. The shorter this period is, the processing load becomes heavier, but the response speed is increased. On the other hand, the longer the period is, the processing load is reduced, but the response speed is deteriorated. Firstly, the transmission queue is referred to (S25). It is checked whether or not there is a scene whose time period until the start time is equal to a predetermined period of time (for example, one minute before starting) (S26). In this judgment, a scene whose time until the start time becomes less than the predetermined period of time, or a scene having already started may be assumed as "Yes". As for the scene being "Yes", the scene information is transmitted to the user via a short message or a mail.

Next, the viewing stage for a user to view a scene based on the scene information thus received will be explained.

Figure 10:
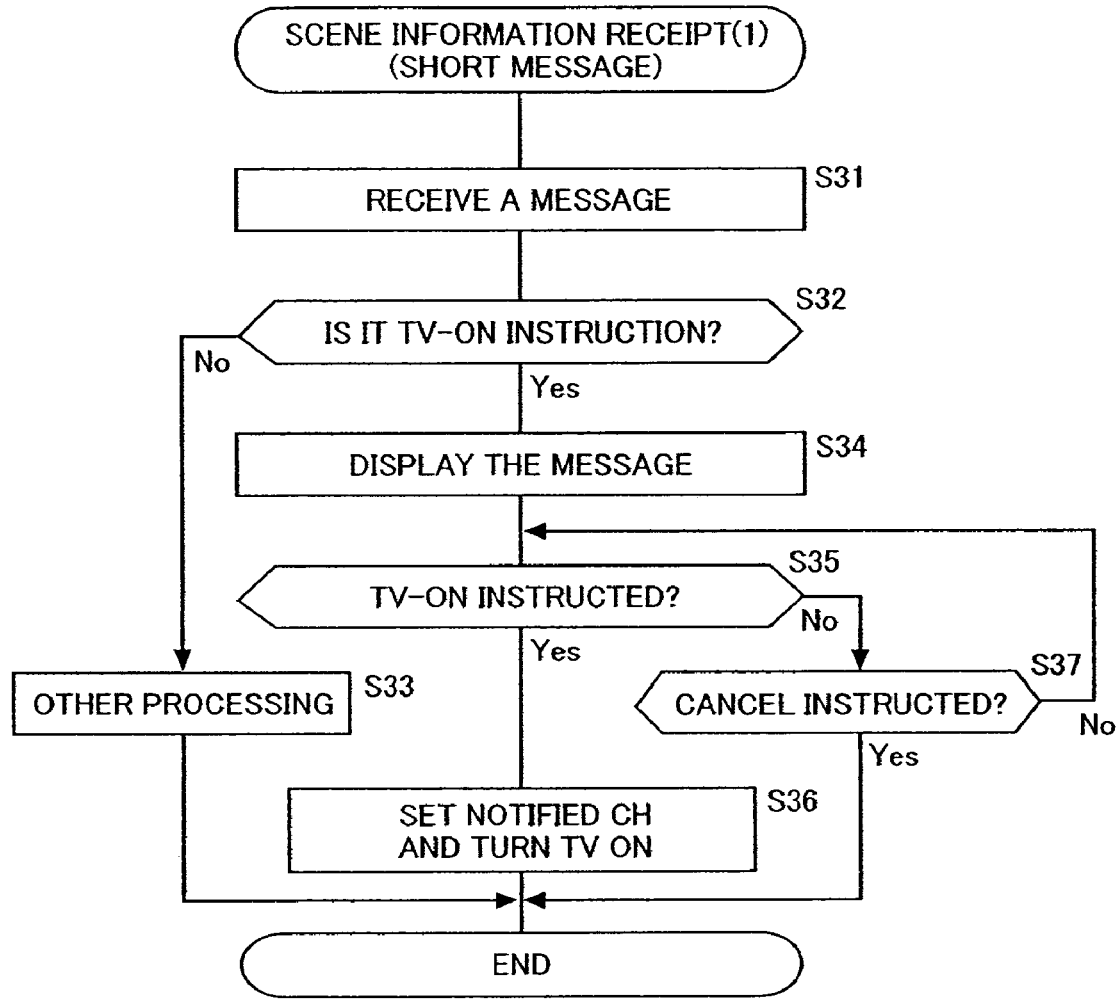
FIG. 10 is a flowchart of the scene information receiving process (1) on the terminal according to an embodiment of the present invention.

FIG. 10 shows a flowchart of the scene information receiving process (1) on the terminal. In this flowchart, a short message is used as a message. When the terminal receives the message (S31), it checks whether or not the message instructs TV On (S32). This is determined by predetermined character string and the like which are included in the message (not only the message in the body part (main text) of the mail but also attribute information and the like attached to the message), or existence/non-existence or the like as to the scene information. If the message is other than the TV On instruction, other normal processing is performed (S33). If the message is the TV On instruction, a message including the scene information is displayed on the display unit (S34). When the terminal is a flip phone having a sub display unit in addition to the main display unit, this message may be displayed on the sub display unit while it is folded. In response to the message, when the user conducts an operation to instruct TV On (for example, press a preset key), the terminal sets the channel (CH) as notified in the scene information, and turns the TV On (S36). If there is an operation from the user instructing a cancel (S37, Yes), this processing is terminated. The processing may also be terminated upon timeout after a lapse of predetermined period of time instead of canceling instruction.

Figure 11:
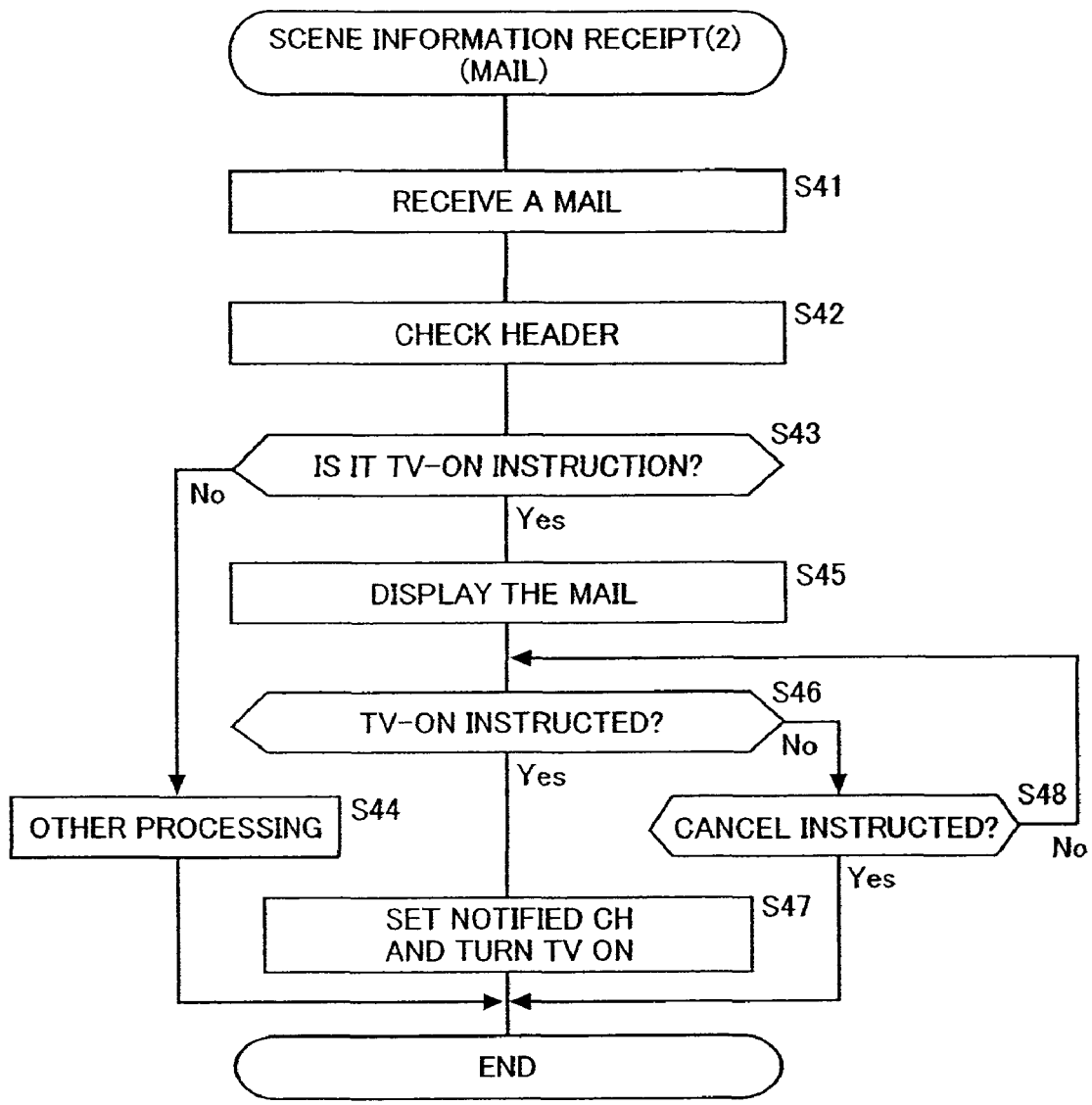
FIG. 11 is a flowchart of the scene information receiving process (2) on the terminal according to an embodiment of the present invention.

FIG. 11 shows a flowchart of the scene information receiving process (2) on the terminal. This flowchart shows a case where a mail is utilized. Upon receipt of a mail (S41), the terminal checks the header information (S42). In this example, it is assumed that the header information of the mail includes information indicating TV On instruction. If the mail is not the TV On instruction (S43, No), other normal processing is executed (S44). If it is the TV On instruction, the terminal displays the mail main text including the scene information on the display unit (S45). As in the processing shown in FIG. 10, when the user conducts an operation instructing TV On (S46, Yes), the terminal sets the notified channel, and turns the TV On (S47). If there is an operation from the user instructing a cancel (S48, Yes), this processing is terminated.

Figure 12:
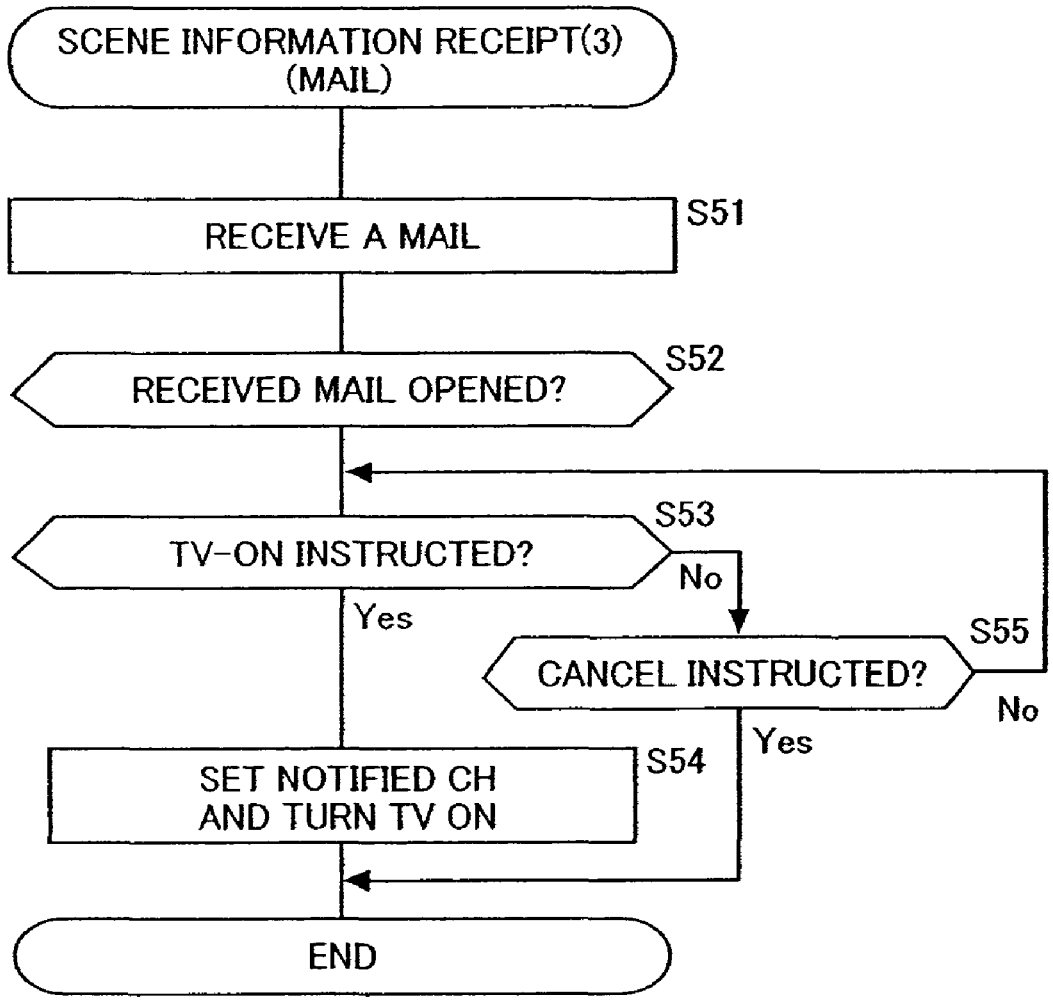
FIG. 12 is a flowchart of the scene information receiving process (3) on the terminal according to an embodiment of the present invention.

FIG. 12 shows a flowchart of the scene information receiving process (3) on the terminal. This is also a case utilizing a mail, but the TV On instruction is included in the main text instead of the header. The terminal receives a mail (S51). When this mail is opened (S52) and if scene information is included in the mail main text, according to the TV On instruction from the user (S52), the notified channel is set and TV is turned ON (S54). If there is an operation from the user instructing a cancel (S55, Yes), this processing is terminated.

It is to be noted that in any of the scene information receiving processes as described above, it is also possible to configure such that the ending time of the scene is also received as a part of the scene information, and the TV is turned OFF automatically at the ending time.

Figure 13:
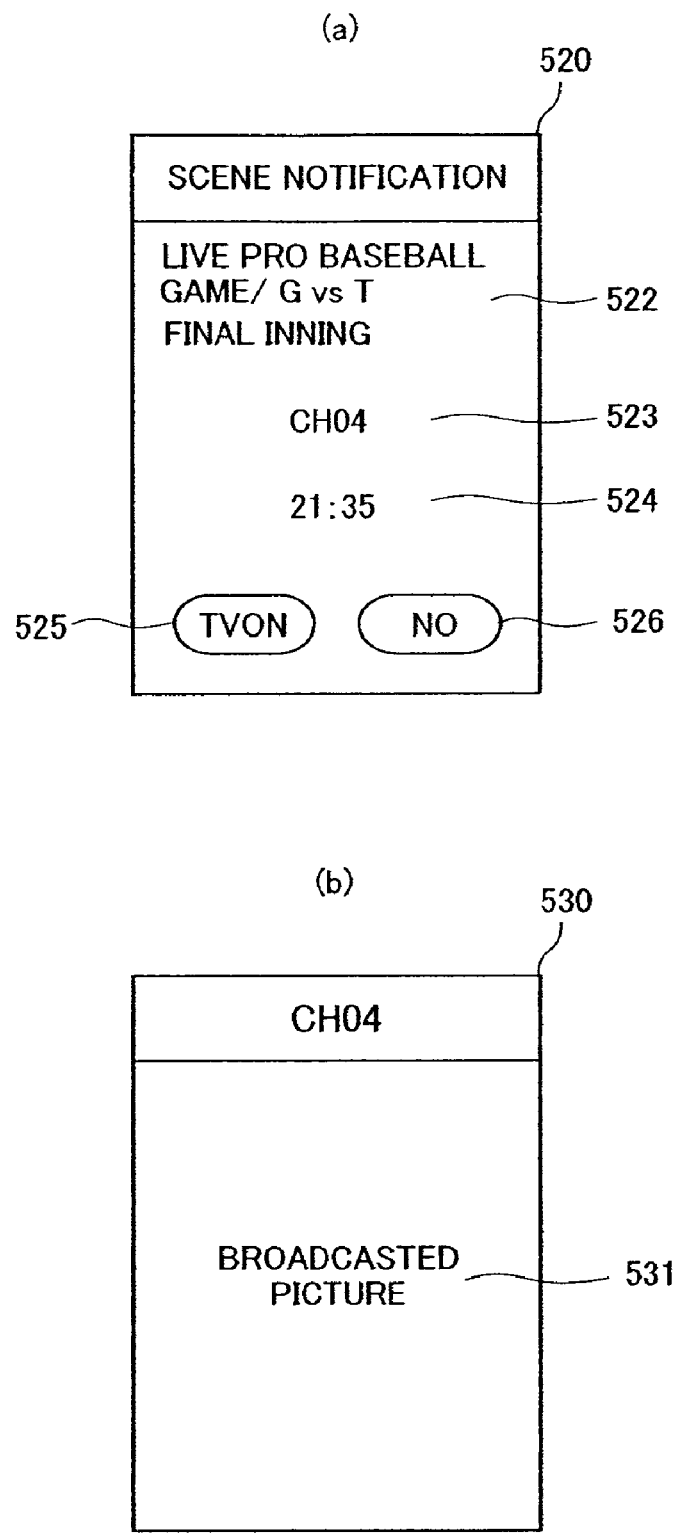
FIG. 13 includes illustrations of display screen (a) of the scene notification message on the terminal, and display screen (b) showing a status that broadcasted picture is displayed when "TV ON" is instructed via the button on the screen (a), according to an embodiment of the present invention.

FIG. 13(a) shows an example of display screen 520 indicating a message of the scene notification. In this example, the scene information includes scene title information 522, broadcast CH 523, and broadcast start time 524. The scene title information 522 includes the name of the program so that it is easily recognized by the user. The button 525 is for the user to instruct TV On, and the button 526 is to instruct canceling. By use of the button 525, the user is allowed to start immediately TV broadcast receiving/reproducing capability without complicated operations for setting the TV channel and turning the TV function on, and starts viewing the broadcast program having been notified. The display screen is just an example, and another layout, such as displaying additional items (for example, ending time) may be employed.

FIG. 13(b) shows a display screen 530 showing a status that a broadcasted picture 531 is displayed when TV On has been instructed via the button 526 on the screen as shown in FIG. 13(a).

Figure 14:
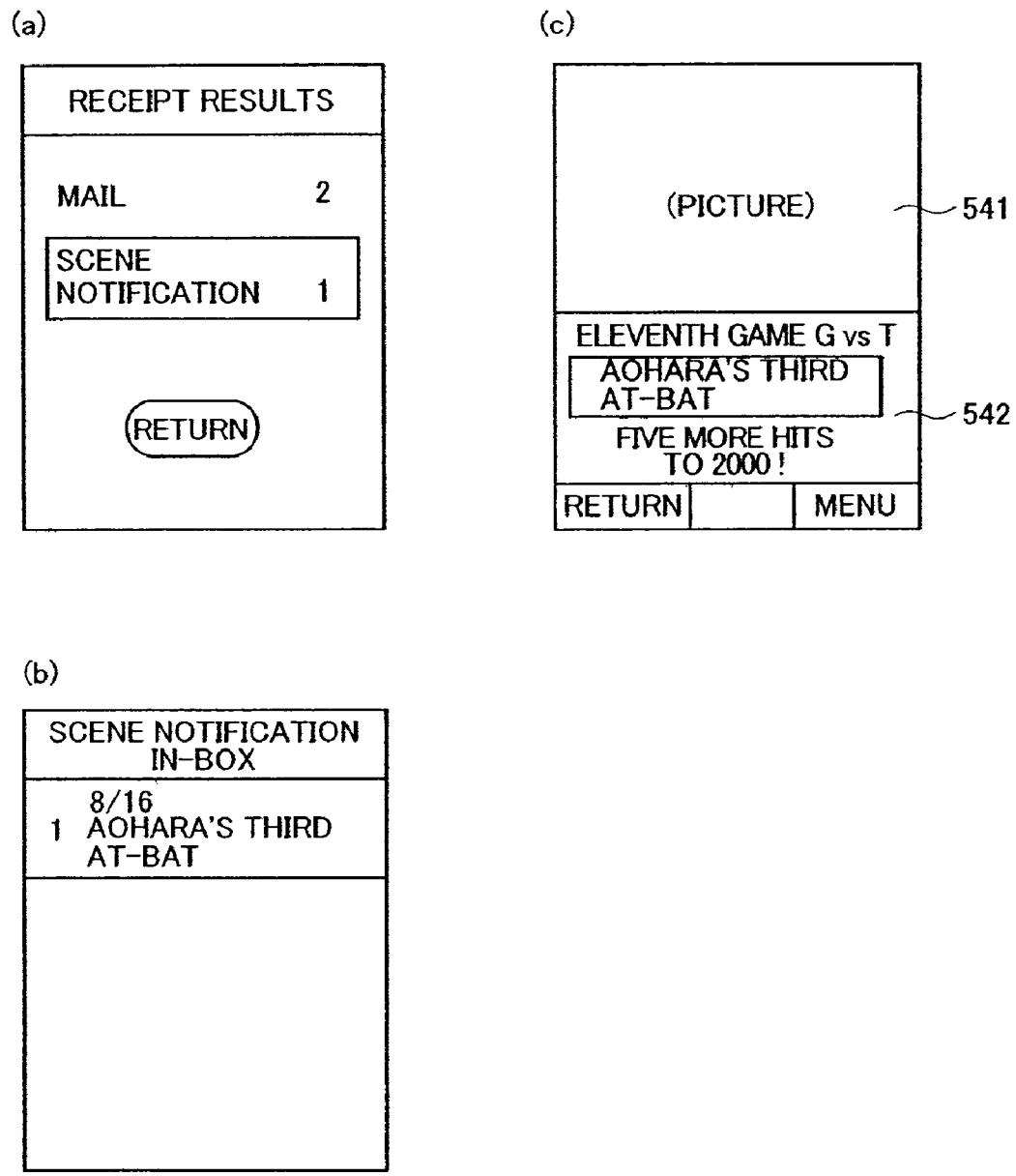
FIG. 14 includes illustrations of another example of display screens (a) to (c) on the terminal, showing transition of screens according to an embodiment of the present invention.

FIG. 14 includes transition examples (a) to (c) of another display screen on the terminal according to the present embodiment. In this examples, as shown in (a), the number of scene notification counts is added as a list to a screen showing a result of received mail or the like. When the user instructs to select the "scene notification" on this list display screen, the screen is shifted to a screen indicating the scene notification in-box as shown in (b). In this in-box, there are displayed date of the received scene notification and the name of the scene. In this example here, only one scene notification is displayed, but a plurality of scene notifications may exist. When the user instructs to select the scene notification displayed on the in-box screen, the TV is turned ON with the channel notified in the scene notification, and as shown in (c), reproduced picture on the channel is displayed. In the example of this screen, the screen is partitioned vertically into split screens 541 and 542. The picture is displayed on the upper split screen 541 and broadcast data (for example, description in BML) attached to the broadcast program is displayed on the lower split screen 542. In the present embodiment, when the scene on the channel notified by the scene notification has been reproduced and displayed, this scene notification is deleted from the in-box. It is because mission of the scene notification is deemed to be accomplished when the scene has been viewed. In addition, it avoids confusion when other new scene notifications are mixed together. Since it is significant that the scene notification is made substantially in real time, a notification such as after the expiration of a predetermined time interval from the start time of the scene, or already being over the scene ending time, is determined as unnecessary, and it may be deleted from the scene-notification in-box.

Next, another embodiment of the present invention will be explained. The present embodiment is to provide the user with advertisement information in broadcast along with the notification of scene information. As methods for delivering the advertisement, there may be a delivery via broadcasting and a delivery via network (data communication).

Figure 15:
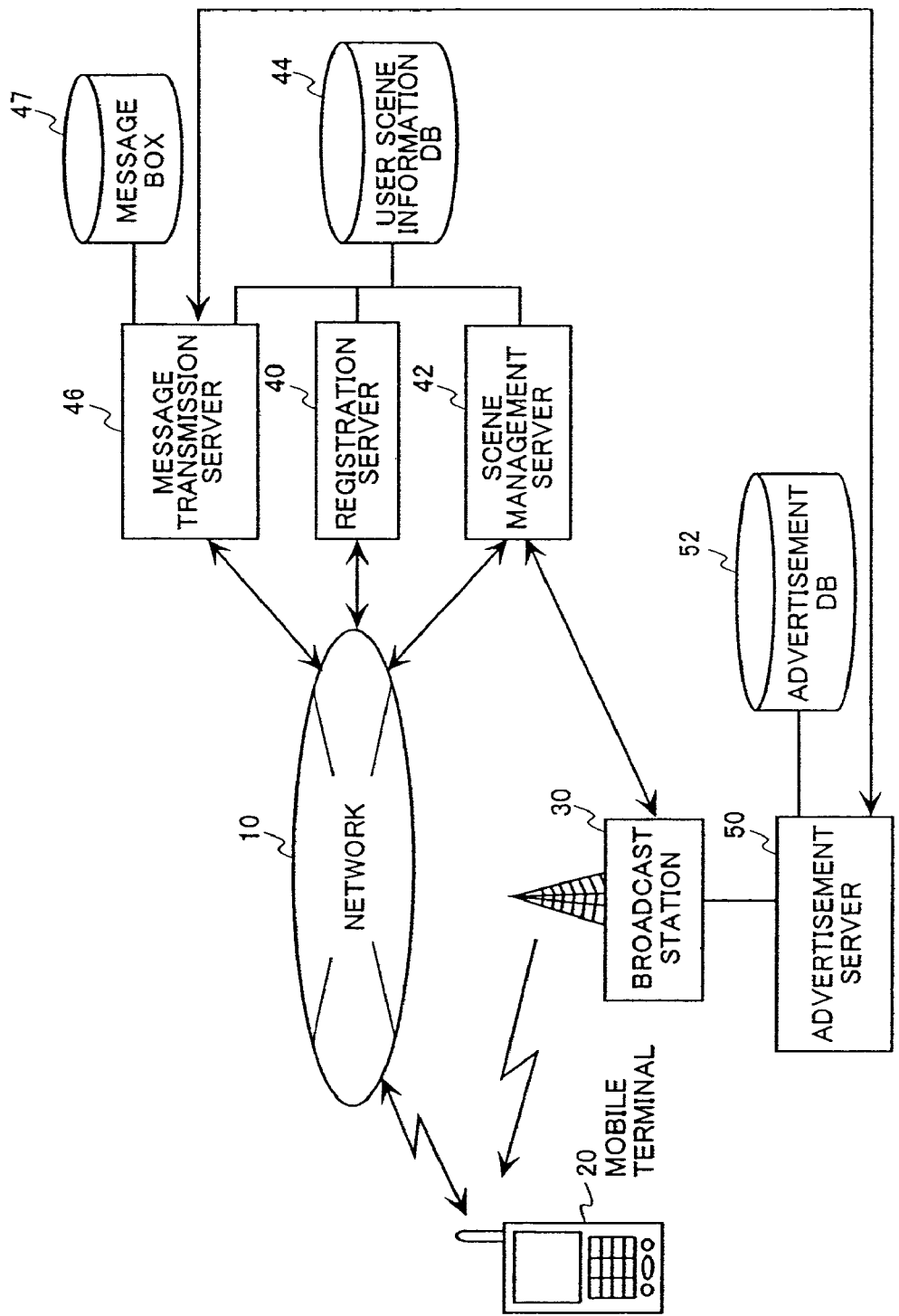
FIG. 15 is a block diagram showing a system configuration in the case where an advertisement is delivered by broadcasting according to another embodiment of the present invention.

FIG. 15 shows a system configuration in the case where the advertisement is delivered via broadcasting. In this configuration, advertisement server 50 is connected to the broadcast station 30 in addition to the system as shown in FIG. 1. The advertisement server 50 has an advertisement database 52 in which advertisement information items are accumulated. The advertisement server 50 and the message transmission server 46 are mutually connected via an exclusive line (or network 10). In broadcasting, the advertisement information may be transmitted as a part of the broadcast program information, or the broadcast program may be transmitted with the advertisement information being added. When the advertisement information is transmitted as a part of the broadcast program, it may be broadcasted, for example, in a form of substituting for CM (commercial message) which is attached to a normal broadcasting. In this case, it is also possible to keep the CM unchanged in the broadcast directed to a normal TV set, and CMs within the scene, or before and after the scene, may be changed only in the broadcast directed to a cell phone. When the information is transmitted being added to the broadcast program, there is a form, for example, repeatedly displaying the information by running text information on a part of the screen. In such a case, the advertisement information can be displayed in such a manner as superimposing on the scene. In the form of repeatedly displaying the advertisement by running text information, multiple advertisements can be easily handled. In order to set the display time of the advertisement information to meet the display time of the scene, not only the start time of the scene but also the ending time is transmitted to the terminal as a part of the scene information. Displaying the advertisement information can be terminated based on the ending time on the terminal side. If the advertisement is formed by digital broadcast described in a markup language such as BML, the user selects a so-called anchor within the advertisement, thereby shifting to the information linked by the anchor, via the network using HTTP protocol by way of the communication unit 206.

Figure 16:
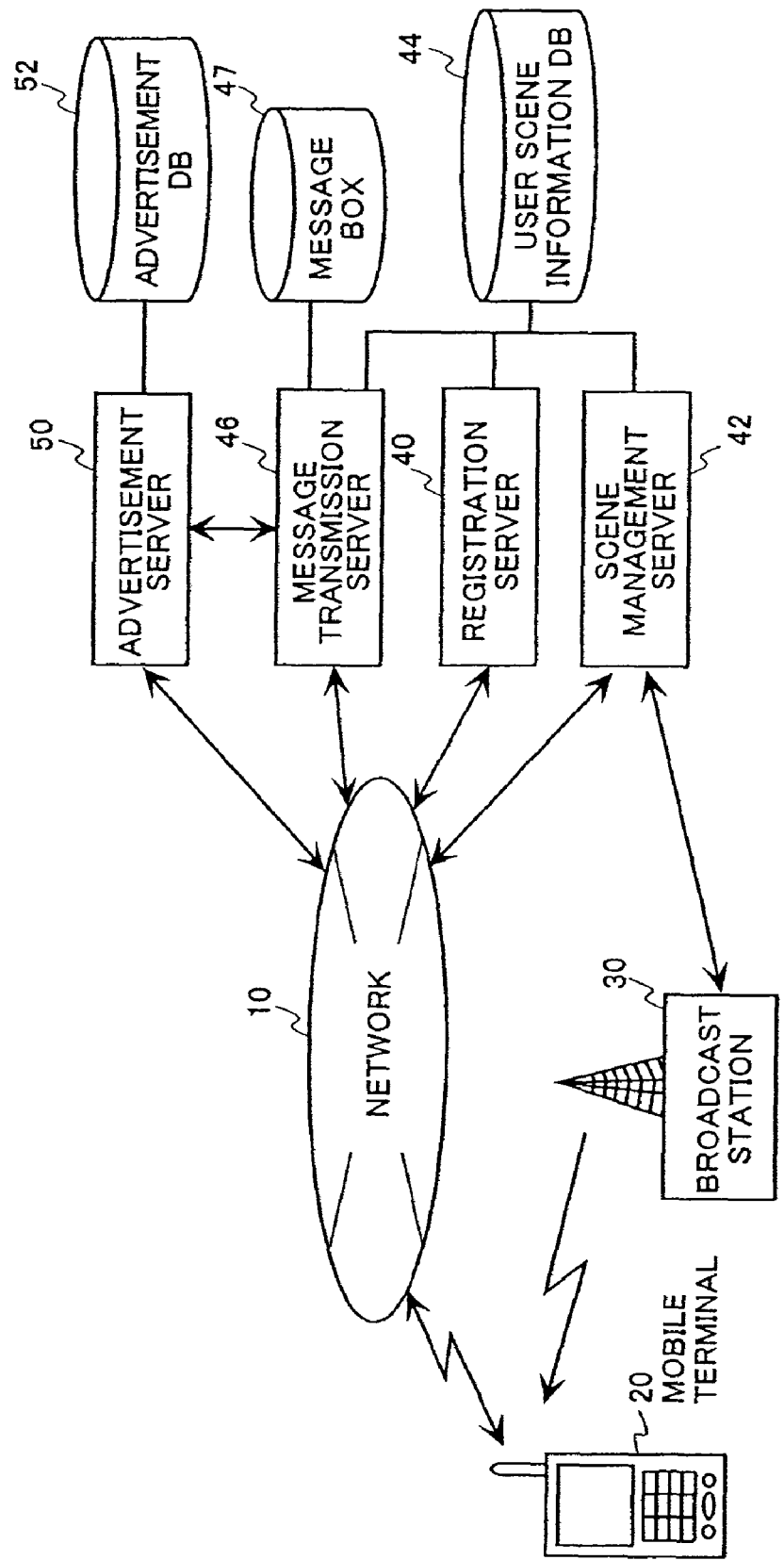
FIG. 16 is a block diagram showing a system configuration in the case where an advertisement is delivered via a network according to another embodiment of the present invention.

FIG. 16 shows a configuration where the delivery is performed via the network. For that purpose, the advertisement server 50 is connected to the network 10. As in the case of FIG. 15, the advertisement server 50 has the advertisement database 52 in which the advertisement information items are accumulated. As a form for displaying the advertisement via the network, there is a form of displaying the advertisement information obtained by data communication in such a manner as superimposing on the broadcast screen (for example, by running text information as described above).

FIG. 17 shows a configuration example of the scene advertisement table 550 stored in the advertisement DB 52 together with the advertisement information. This table is provided for associating each scene with the advertisement information, and includes scene ID column and advertisement ID column with respect to each scene. A plurality of advertisement IDs can be described in one advertisement ID column. In delivering the scene notification, in order that the advertisement information having the advertisement ID associated with the scene is delivered at the time of starting the scene, the advertisement server 50 broadcasts the advertisement information from the broadcast station 30, or performs push-based delivery by data communication via the network 10 as to the advertisement information. For example, the technique disclosed by Non-Patent Document 3 may be utilized for the push-based delivery to a cell phone.

FIG. 18(a) shows an example of advertisement area 532 within the display screen 530 in the case where the advertisement information is repeatedly displayed by running text information. In this example, the advertisement area is set in such a manner as being superimposed on a part (in the illustration, band area on the lower side) of the broadcasted picture 531. It is also possible to configure such that the picture area and the advertisement area do not overlap one another.

FIG. 18(b) shows a specific example of the text information 533 displayed in such a manner as running on the advertisement area. In this example, the text information is displayed repeatedly running from one side of the illustration to the other side (for example, from right to left), just like running a telop.

It is to be noted that the display mode of the advertisement information is not limited to the running display. Furthermore, the advertisement information is not necessarily limited to text information, but it may be a still image, moving image, audio data, URL data, and the like or it may be a combination thereof. It is also possible to add the advertisement information to be associated with a scene. In this case, according to the number of users as destinations for delivering each scene, it is known how many viewers exist for each program scene, that is, a value as advertisement of individual scene can be estimated. Therefore, for instance, an advertising agency is allowed to set a value to the advertisement information delivery scene by scene (set a higher value to the advertisement delivery of a scene having a larger number of delivery counts).

Figure 19:
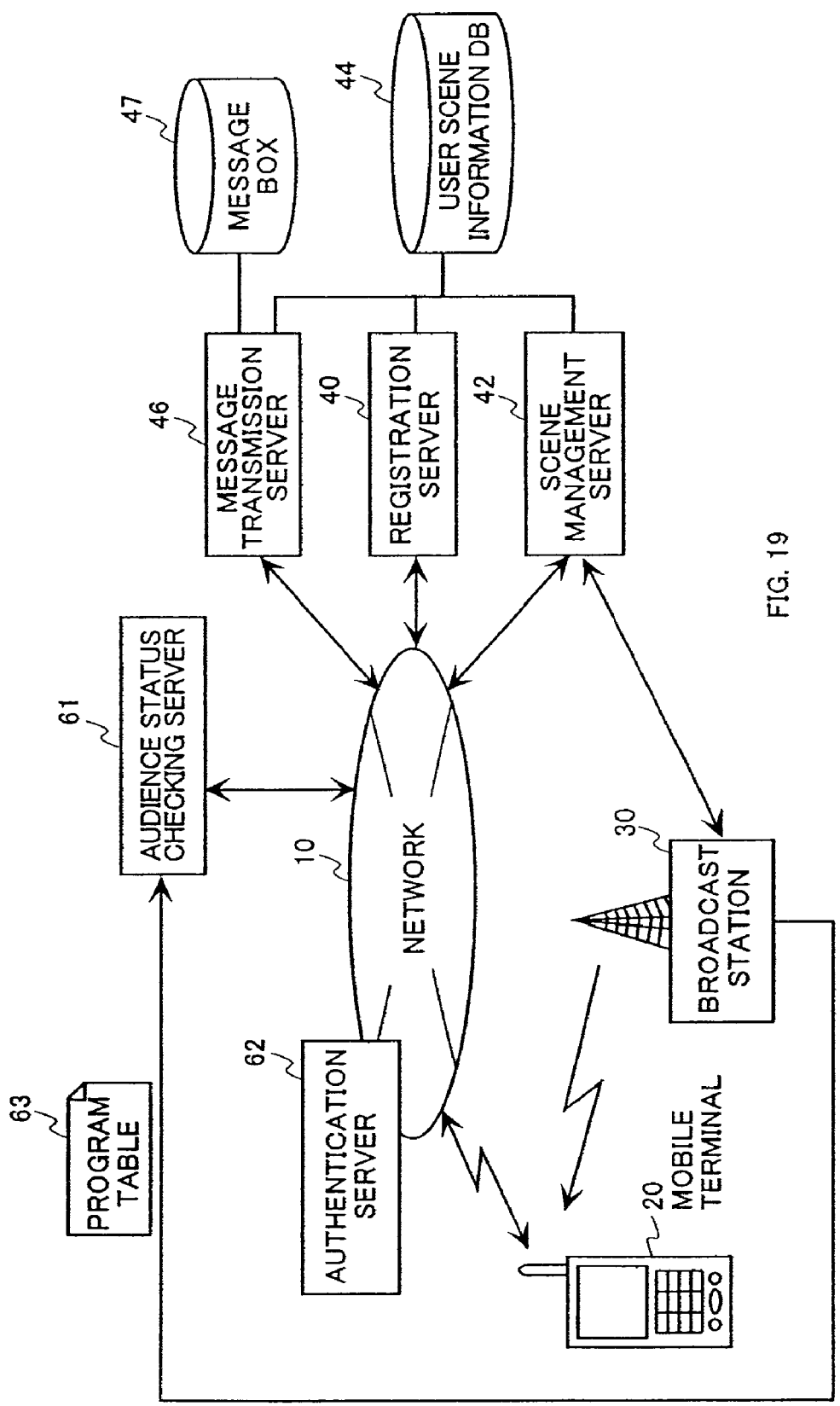
FIG. 19 is a diagram showing a system configuration of the third embodiment of the present invention.

Next, a third embodiment will be explained. FIG. 19 shows a system configuration according to the third embodiment. The same constituent elements in FIG. 1 are labeled the same in FIG. 19, and tedious explanation will not be made. In the system as shown in FIG. 19, audience status checking server 61 is added to the network 10. This audience status checking server 61 performs a process to check audience status of the programs or scenes on various mobile terminals 20, which are responsive to the scene notification service in the present invention. That is, the audience status checking server 61 obtains user's audience status information on each mobile terminal 20, and performs a statistical processing. Specifically, following information items are collectable.

Number of TV On: Real viewing count Number of TV On/Scene information notification count: Viewing rate
Time period from TV On to TV Off: Viewing time Channel tuned information: Channel information (Tuning Information)

In addition, the audience status checking server 61 obtains from the broadcast station 30, a program table 63 on which detailed information of the programs is recorded, and checks the program table against the viewing information (in particular, channel and clock time) obtained from the mobile terminal. If there is a change in broadcasting time due to a live baseball game or the like which has been actually broadcasted, this change is reflected on the program contents in the program table 63, and the program table includes at least the broadcast channel information, actual broadcast start date/time, and ending date/time with respect to each program.

Accordingly, it is possible for the server side to specify a program or a scene which has been viewed actually.

Authentication server 62 may be added to this system, though it is not an essential element. The authentication server 62 is suitable for the case where communication with the cell phone carrier is established by use of a terminal ID, such as in a form of short message, so as to notifying the audience status. With the authentication server, it is possible to prevent a spoof of user, to pinpoint the current position of the user, and to identify the user's personal data to be added to the notification. Accordingly, added-values of the viewing information can be enhanced.

In FIG. 19, the audience status checking server 61 is shown at the location independent of other servers. However, it may be located on the same site of the authentication server 62, or may be located on any site of the other servers 40, 42, and 46.

Hereinafter, various specific processing examples regarding the third embodiment will be explained according to the flowchart.

Figure 20:
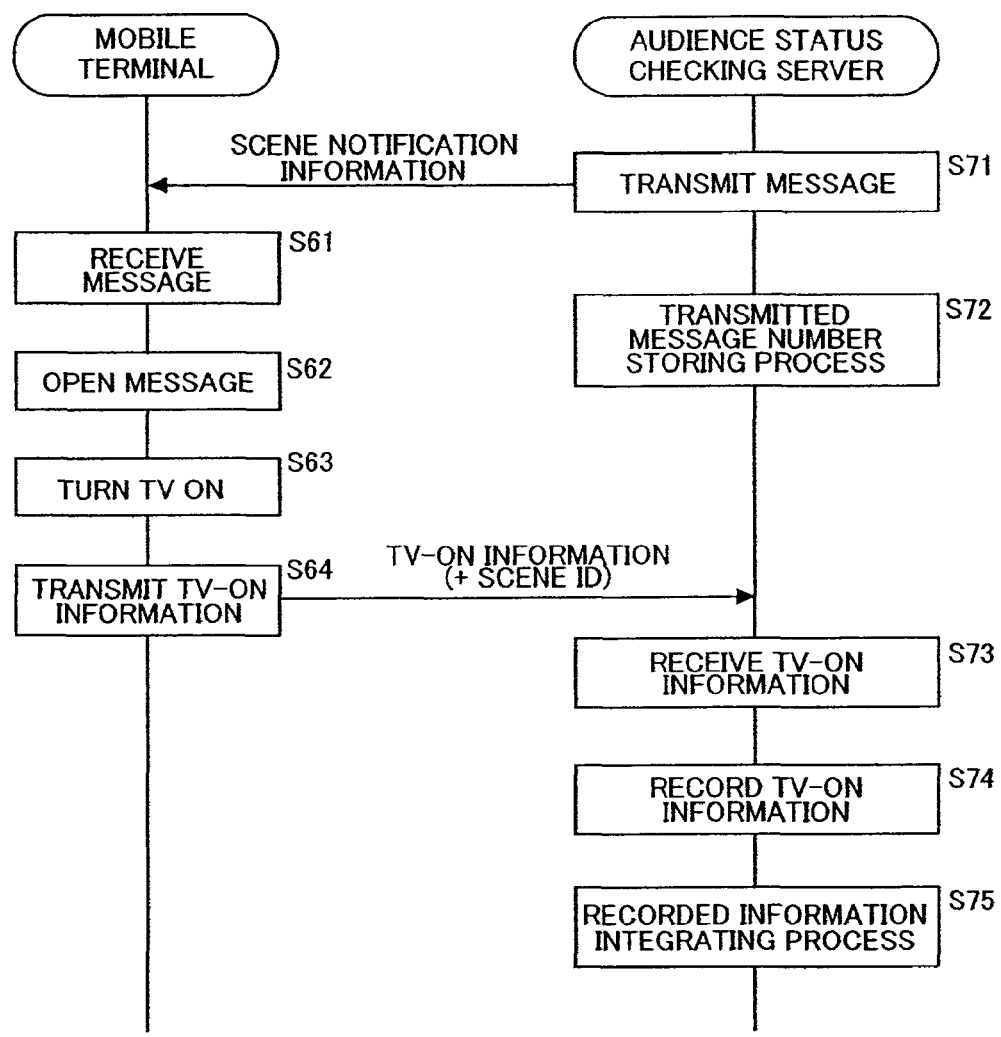
FIG. 20 is a diagram showing an example of operations between the mobile terminal and the audience status checking server, in the case where TV-On information is transmitted to the audience status checking server, according to the third embodiment of the present invention.

Firstly, FIG. 20 shows operation examples between the mobile terminal and the audience status checking server in the case where TV-On information is transmitted to the audience status checking server 61. The audience status checking server transmits a message as scene notification information by use of E-mail or short message (S71). Furthermore, this server stores cumulative number of transmission messages, as the number of scene information notifications (S72). The mobile terminal receives this message (S61), and automatically opens the message (S62). For example, a screen for displaying the scene notification message, which has been explained with reference to FIGS. 13 (*a*) and (*b*), is displayed, and TV function is turned On in response to the user's instruction (S63). In response to this, the mobile terminal creates TV-On information and transmits the TV-On information to the audience status checking server (S64). This transmission data indicates that TV has been turned on, and in addition to this TV-On information, scene ID information may be included. In addition, this transmission data includes a mail address of the sender for the case of E-mail, or information identifying the sending terminal (terminal ID) for the case of short message. Therefore, this substantially indicates that the transmission data includes information for identifying the user of the mobile terminal. When the audience status checking server receives this transmission data (S73), the audience status checking server records thus received TV-On information on the storage device (S74). Subsequently, this server performs a predetermined recorded information integrating process so as to obtain statistical information such as viewing rate as described above (S75).

It is also possible to configure such that TV-On information items are accumulated within the mobile terminal, and those cumulative information items are periodically put all together and transmitted to the audience status checking server. This kind of batch processing is also applied to the other flowcharts which will be described below.

Figure 21:
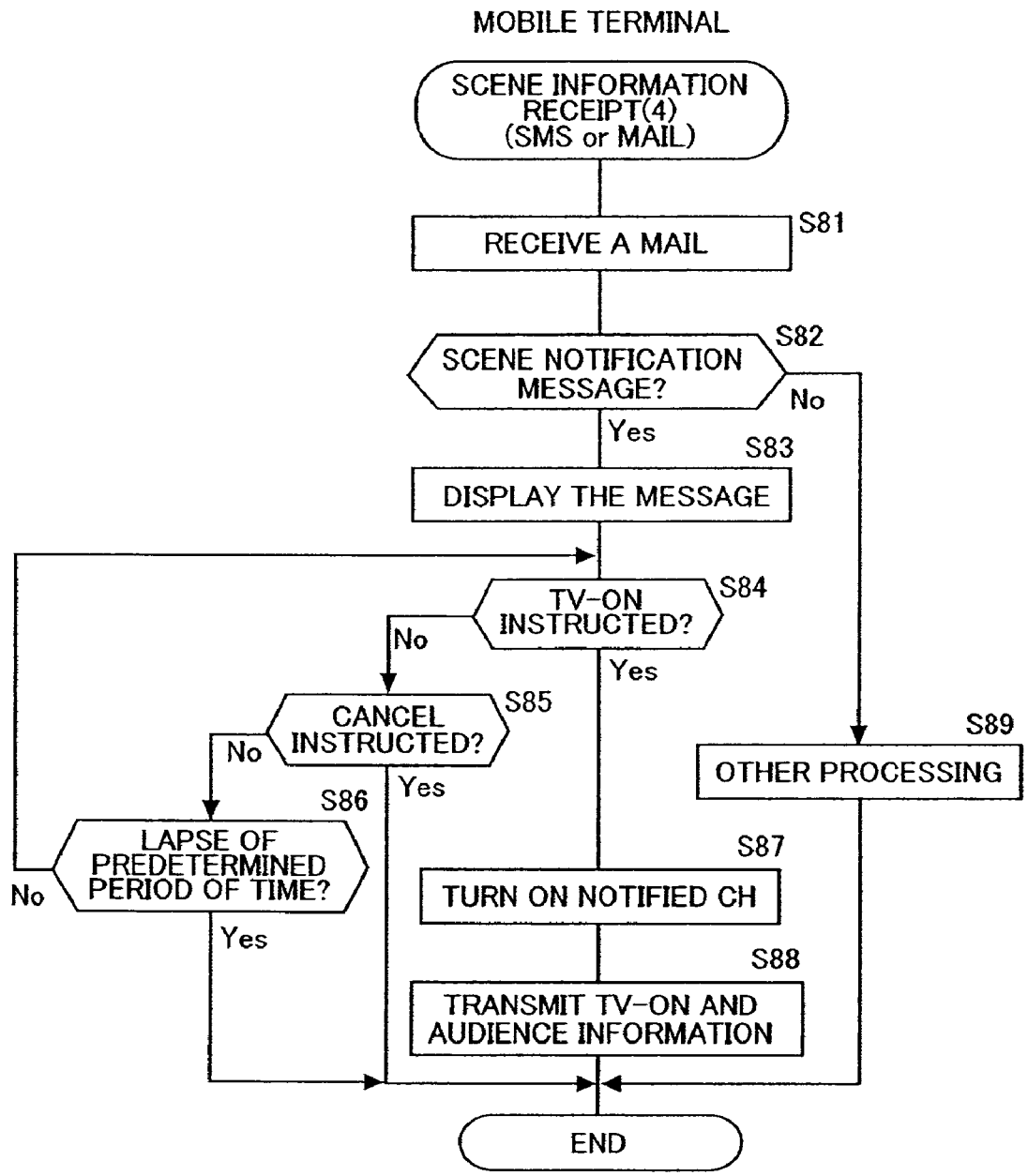
FIG. 21 is a flowchart showing the scene information receiving process (4) on the mobile terminal which has been explained with reference to FIG. 20.

FIG. 21 is a flowchart showing the scene information receiving process (4) which has been explained with reference to FIG. 20.

When the mobile terminal receives the message in a form of short message or E-mail message (S81), it is judged whether this message is a scene notification message (S82). If it is not a scene notification message, other processing as before is executed (S89). If it is a scene notification, the message is displayed as explained with reference to FIGS. 13(*a*) and (*b*) (S83), the mobile terminal waits for the user's instruction. If there is a TV On instruction (S84, Yes), the channel thus notified is turned on (S87). Subsequently, the viewing information, such as TV-On information and scene ID, is transmitted to the audience status checking server (S88).

Figure 22:
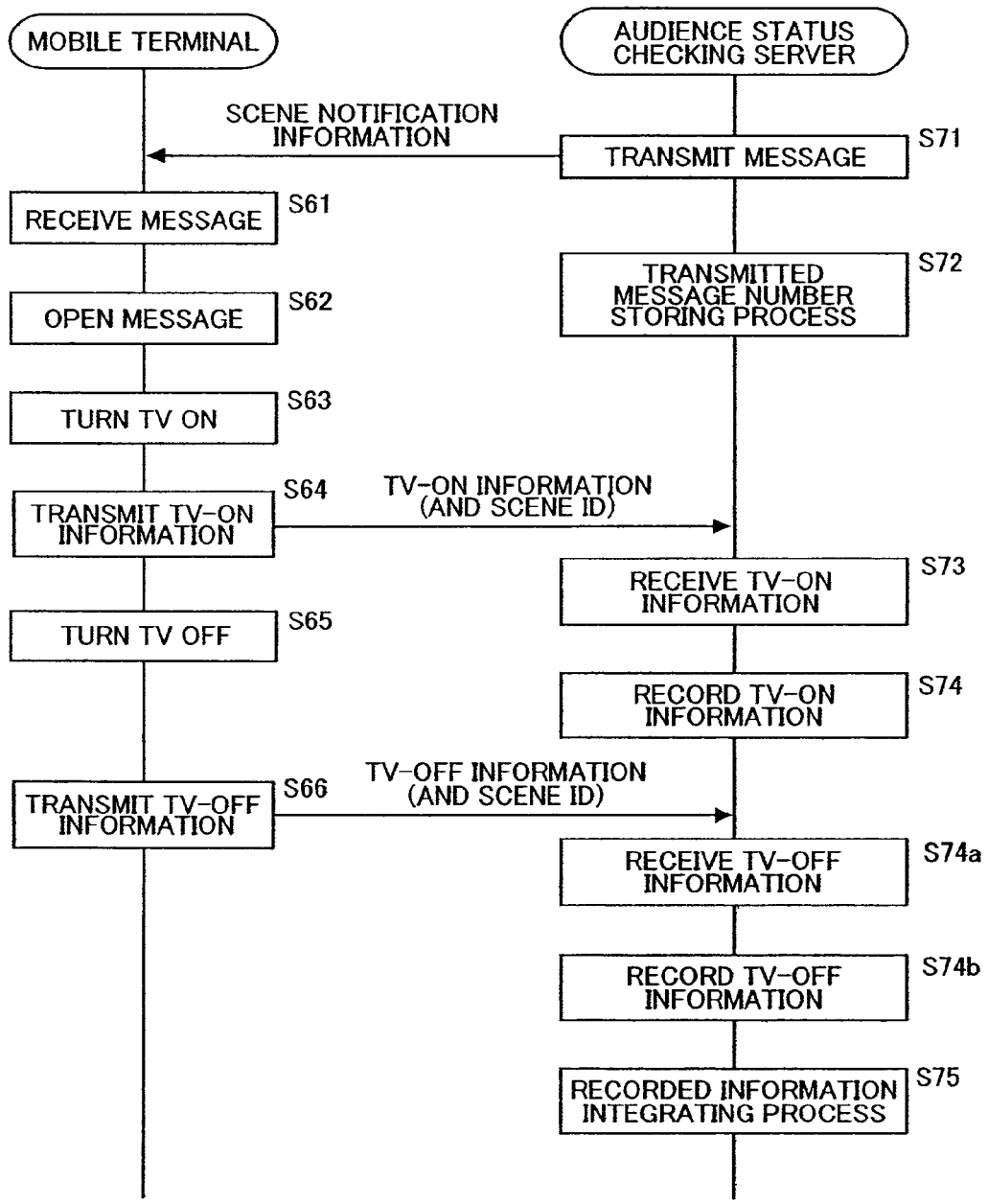
FIG. 22 is a diagram showing an example of operations between the mobile terminal and the audience status checking server in the case where TV-On information and TV-Off information are transmitted to the audience status checking server, according to the third embodiment of the present invention.

FIG. 22 shows another operation example between the mobile terminal and the audience status checking server in the case where TV-On and TV-Off information items are transmitted to the audience status checking server. In this example, TV-Off related information is also transmitted as the information upon TV-Off. The same steps in FIG. 20 are labeled the same in FIG. 22, and tedious explanation will not be made. In the process in FIG. 22, when the TV is turned off (S65), TV-Off information and scene ID information are transmitted to the audience status checking server (S66). In this example, as the information upon TV-Off, it is possible to transmit the time of turned Off, a time period from On to Off, and the like, in addition to the TV-Off information and the scene ID information. The audience status checking server receives the TV-Off information and the like (S74*a*), records those information items (S74), and performs recorded information integrating process (S75). It is to be noted that the TV-On information and the TV-Off information are transmitted separately, but it may be possible to transmit the TV-On information and the TV-Off information all together.

Figure 23:
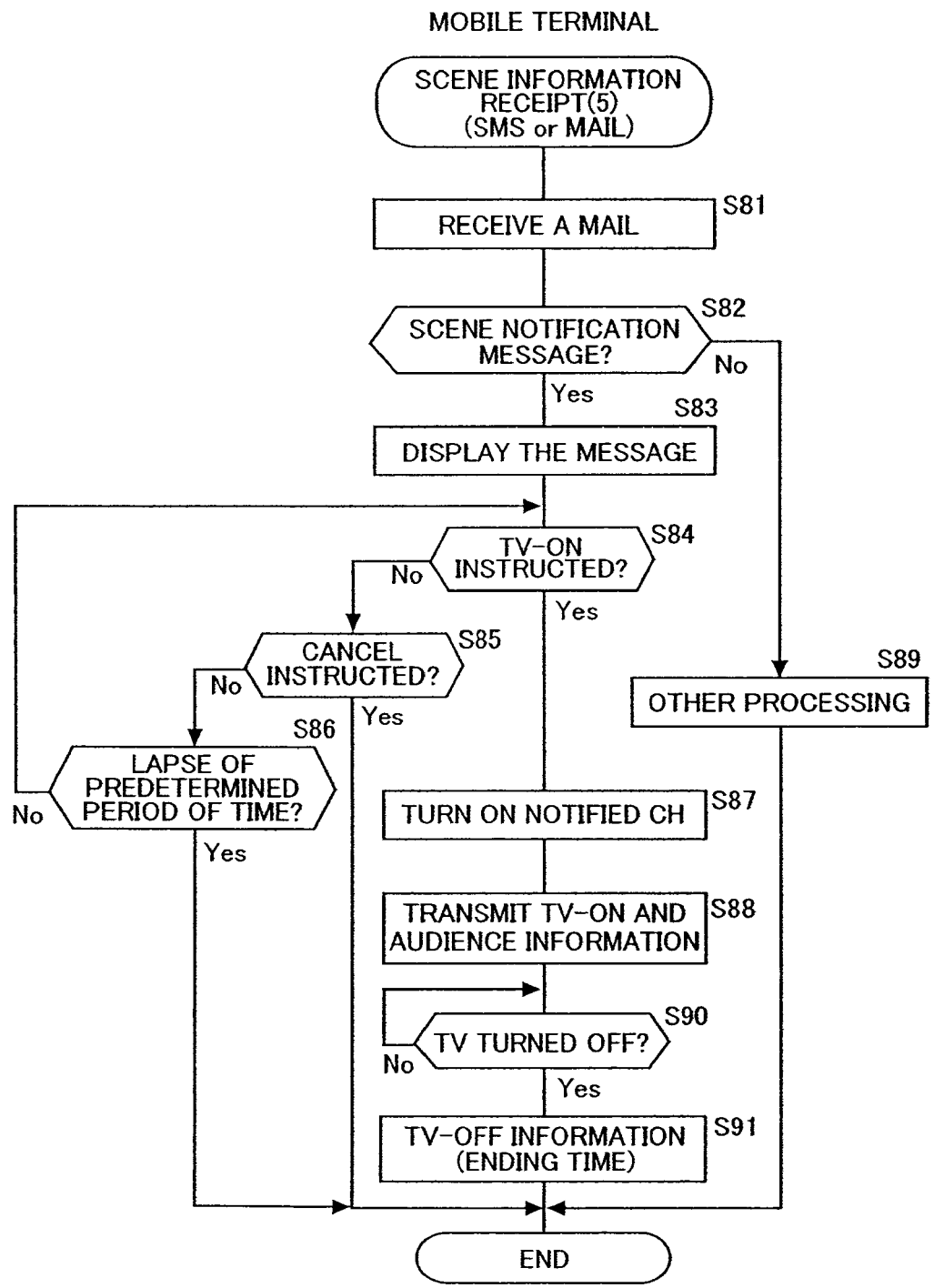
FIG. 23 is a flowchart showing the scene information receiving process (5) on the mobile terminal which has been explained with reference to FIG. 22.

FIG. 23 is a flowchart showing the scene information receiving process (5) in the mobile terminal as explained with reference to FIG. 22. The same steps in FIG. 21 are labeled the same in FIG. 23, and tedious explanation will not be made. When the status is changed to TV-Off after being TV-On (S90, Yes), the TV-Off information and the like are transmitted to the audience status checking server (S91).

Figure 24:
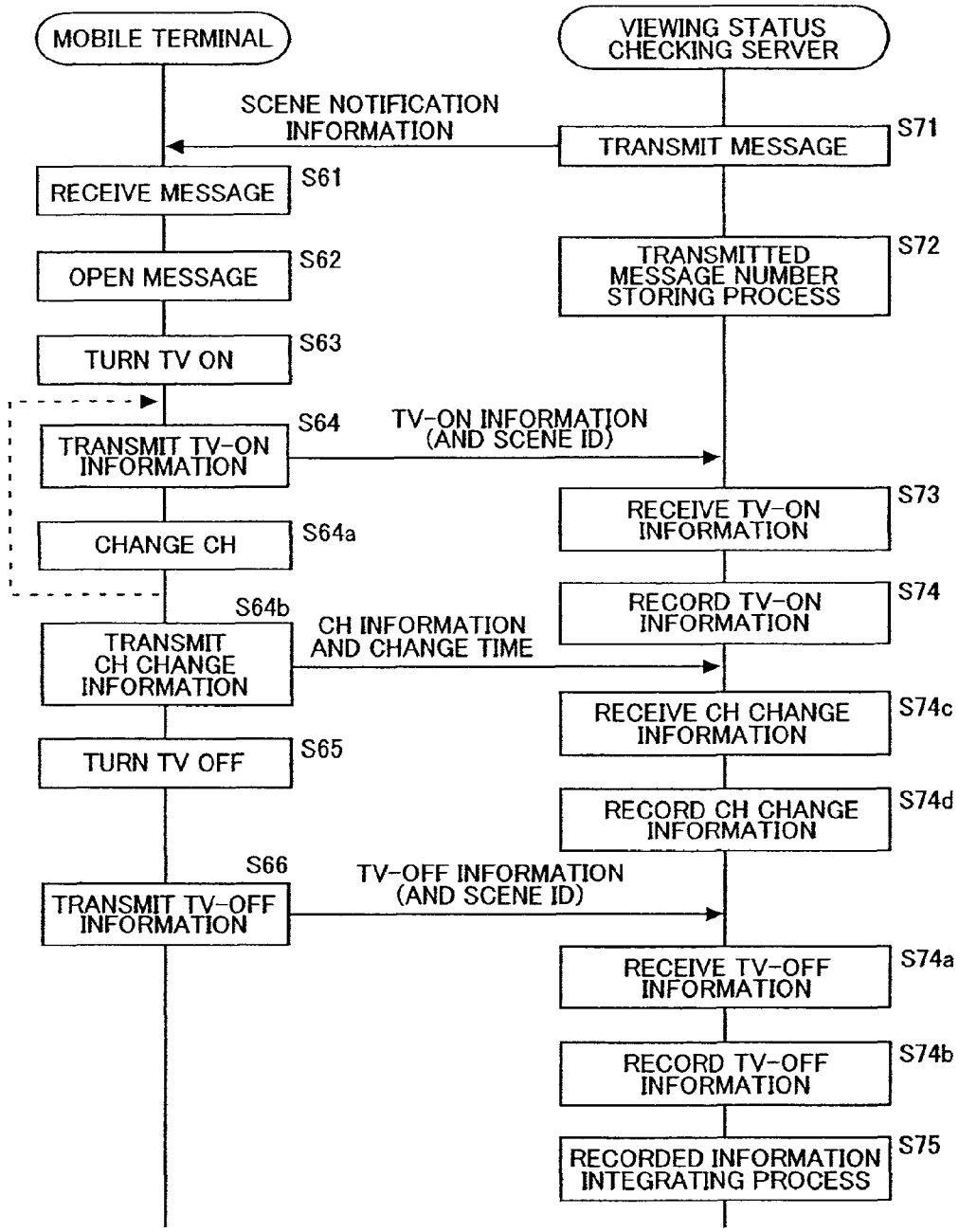
FIG. 24 is a diagram showing a further alternative example of operations between the mobile terminal and the audience status checking server in the case where channel change information is also transmitted to the audience status checking server, according to the third embodiment of the present invention.

FIG. 24 shows an example of further alternative operation between the mobile terminal and the audience status checking server in the case where the channel change information is also transmitted to the audience status checking server. In this example, in addition to the process as shown in FIG. 22, it is detected as an event that the TV channel has been changed from the instructed channel, and this information is notified to the audience status checking server. The same steps in FIG. 22 are labeled the same in FIG. 24, and tedious explanation will not be made. In the process of FIG. 24, when the channel change is found on the mobile terminal after step S64 (S64*a*), new channel information is transmitted as channel change information, to the audience status checking server together with the change time information (S64*b*). Upon receipt of the channel change information (S74*c*), the audience status checking server records this information (S74*d*). In step S75, recorded information integrating process is performed including this channel change information.

Figure 25:
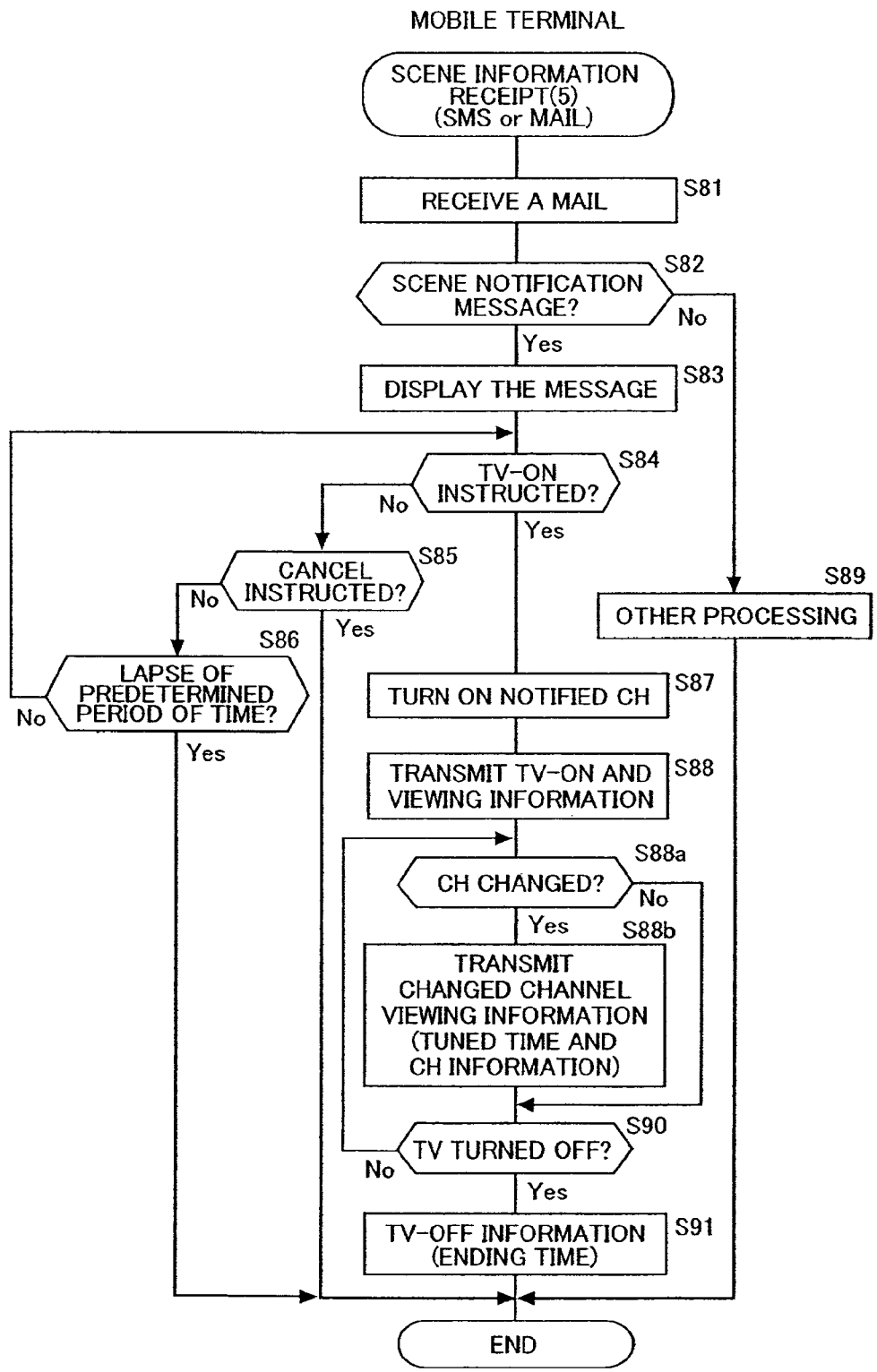
FIG. 25 is a flowchart showing the scene information receiving process (6) on the mobile terminal as explained with reference to FIG. 24.

FIG. 25 is a flowchart showing the scene information receiving process (6) in the mobile terminal as explained with reference to FIG. 24. The same steps in FIG. 23 are labeled the same in FIG. 25, and tedious explanation will not be made. If the channel is changed after the viewing information is transmitted in step S88, the channel information after the change is transmitted to the audience status checking server together with its time information (S88*b*).

Figure 26:
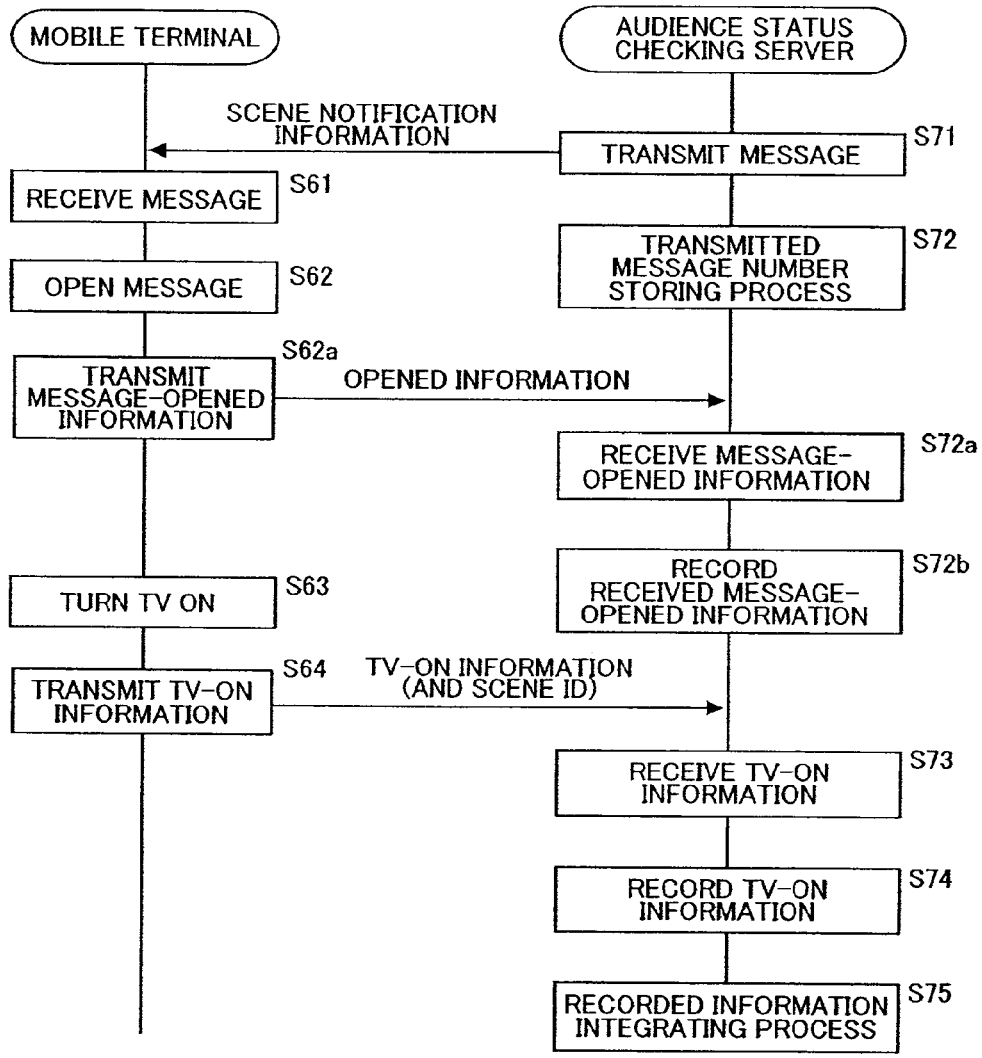
FIG. 26 is a diagram showing a modified example of the process as shown with reference to FIG. 20.

FIG. 26 shows a variation example of the process as shown in FIG. 20. The same steps in FIG. 20 are labeled the same in FIG. 26, and tedious explanation will not be made. FIG. 20 shows that opening and displaying of the message are automatically performed. However, in the example of FIG. 26, the message is opened according to a message opening instruction from the user (S62). The user is allowed to determine that the message is a scene notification based on the title being displayed. After the message is opened, the mobile terminal sends a notification that the message has been opened (transmission of message-opened information) to the audience status checking server (S62a). The audience status checking server receives this message-opened information (scene notification opened information) (S72a), and records this information (S72b). This information is utilized by the recorded information integrating process (S75) together with the aforementioned another information items. The audience status checking server is allowed to obtain an opened rate, based on the total number of notifications of opened information with respect to the total number of scene notifications.

Figure 27:
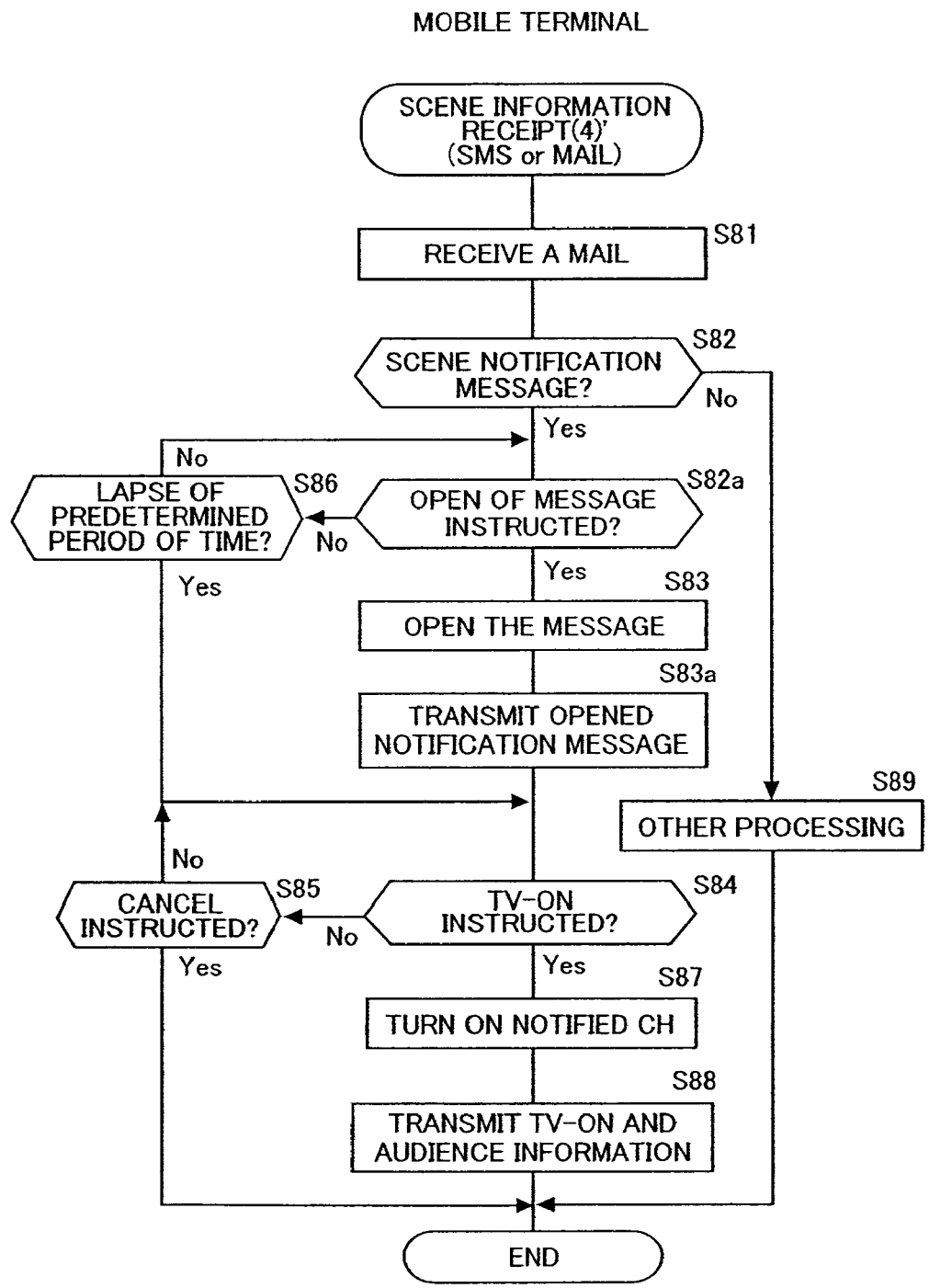
FIG. 27 is a flowchart showing a modified example of the scene information receiving process on the mobile terminal as explained with reference to FIG. 26.

FIG. 27 is a flowchart showing a variation example of the scene information receiving process in the mobile terminal as explained with reference to FIG. 26. The same steps in FIG. 21 are labeled the same in FIG. 27, and tedious explanation will not be made. If there is an instruction from the user to open the message (S82a, Yes) upon receipt of the scene notification message (S82), the message is opened (S83). Subsequently, the opened notification message is transmitted to the audience status checking server (S83a).

Figure 28:
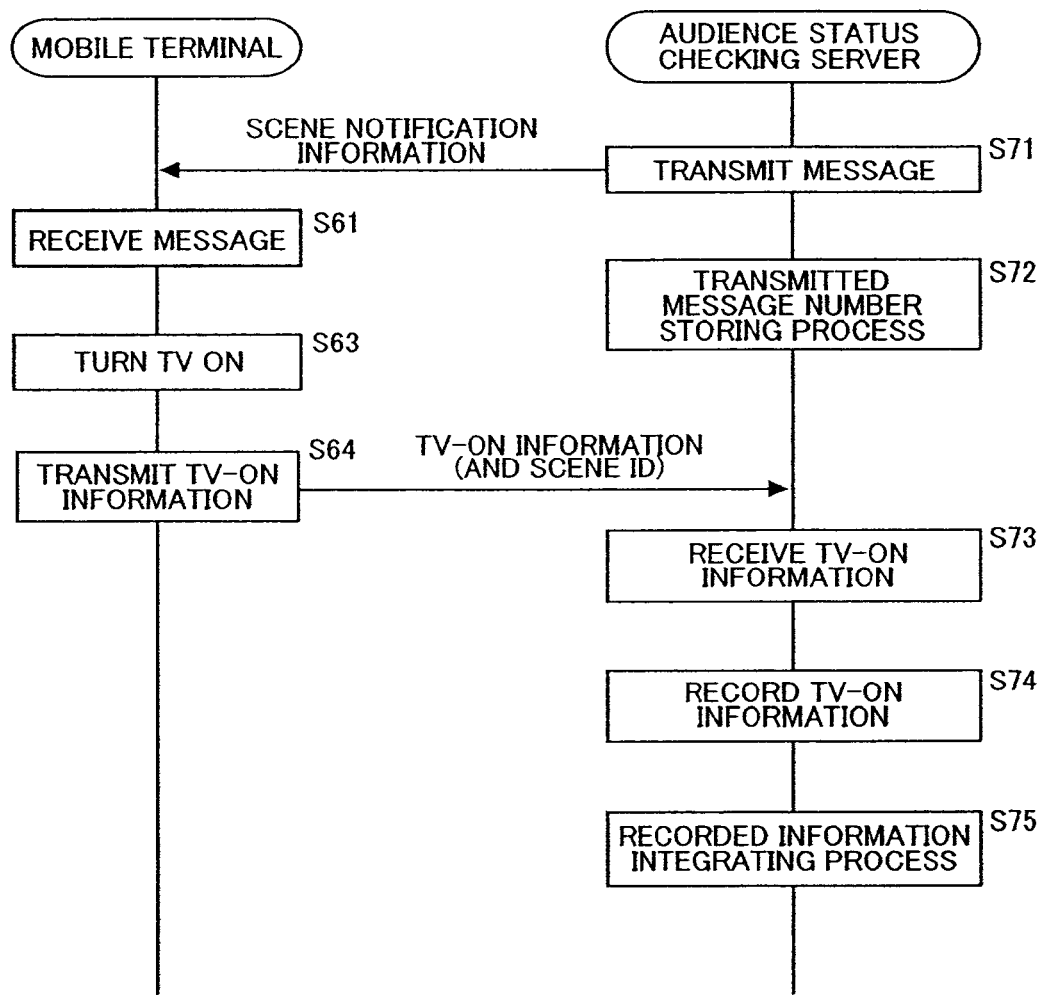
FIG. 28 is a diagram showing another modified example of the process as shown with reference to FIG. 20.

FIG. 28 is a flowchart showing another variation example of the process as shown in FIG. 20. The same steps in FIG. 20 are labeled the same in FIG. 28, and tedious explanation will not be made. In FIG. 20, TV-On is performed according to the instruction from the user, but here in this process, when the mobile terminal receives the scene notification message, the terminal automatically determines that the scene notification message has been received, and automatically operates TV on (S63) on the channel indicated in the instruction. Other processing is the same as shown in FIG. 20.

Figure 29:
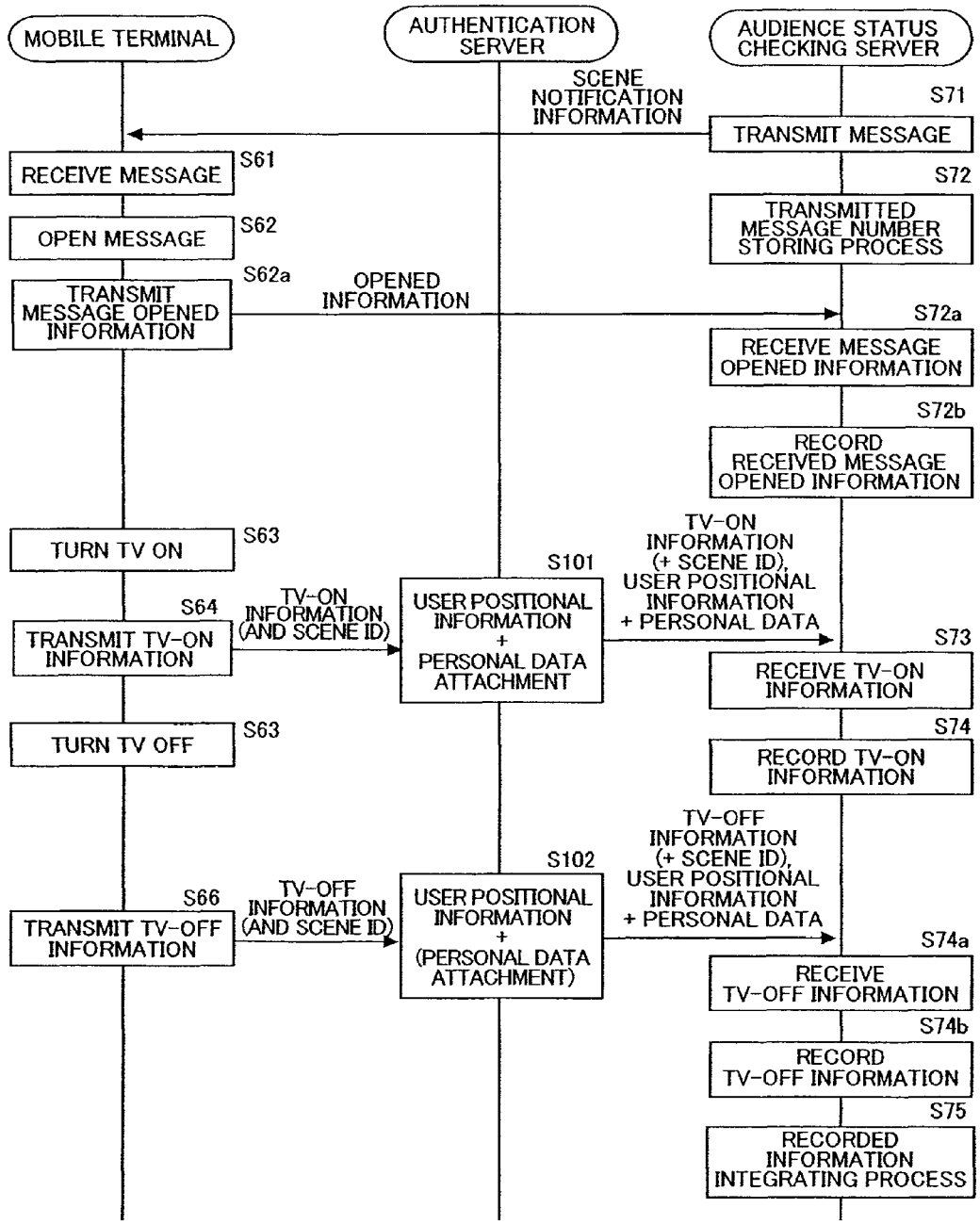
FIG. 29 is a diagram showing a process for performing information exchange by use of authentication server, among the mobile terminal, the authentication server, and the audience status checking server.

FIG. 29 shows information exchange among the mobile terminal 20, authentication server 62, and the audience status checking server 61, in the case where the authentication server 62 is utilized. The same steps in FIG. 24 and FIG. 26 are labeled the same in FIG. 29. In this process, the TV-On information from the mobile terminal is transmitted to the audience status checking server via the authentication server by a short message. Here, the authentication server 62 relaying this transmission adds predetermined information to the transmitted information. The authentication server 62 is installed on a cell phone carrier site, for instance, and the user positional information (registered information as to the current position of the mobile terminal) is recognized based on the location or the like of a base station to be accessed. Furthermore, according to the contractual coverage as to the right in using the communication line of the mobile terminal, it is possible to identify based on the terminal ID, the personal data of the user, such as sex, age (generation) and the like. The authentication server 62 attaches those additional information items to the TV-On information, and transmits them to the audience status checking server (S101). Also in transmitting the TV-Off information at the time of TV-off operation on the mobile terminal, those additional information items are similarly attached. By considering such additional information items into the recorded information integrating process on the audience status checking server, it is possible to obtain more detailed statistical information, to which the user's position and the personal data are incorporated.

Each process in the above described flowcharts can be arbitrarily combined as far as the combination is feasible.

As thus described, preferred embodiments of the present invention have been explained, but in addition to those explained, they can be variously modified or changed.

For example, explanations have been made as to a mobile terminal so far, but it does not exclude an example that the present invention is applied to a fixed TV set having a capability of data communication.

Furthermore, in the above explanation, it is assumed that a scene notification is received during the time when TV broadcast is not received and reproduced. However, it may also be possible to configure such that upon receipt of the notification during the TV broadcast receiving and reproducing, the terminal automatically determines whether or not the notification is a scene notification or not. If it is so, the terminal checks whether or not the current channel reproducing the broadcast corresponds to thus notified channel, and if it does, no action is made. If the current channel is not the notified one, the user is put on notice that there is such a scene notification by an arbitrary displaying manner such as text display or icon display.

In the above examples, there has been explained that the scene notification is performed by use of the phone number or E-mail address. However, the scene information may be included in data of the digital broadcast. In this case, there is also a configuration that in order to identify a specific receiver out of unspecified number of receivers, target user identification information (for example, cell phone number, postal code, and the like) is inserted into a transmission packet header of the scene information, and a choice is made as to the scene information on the receiving terminal side. If the cell phone number is utilized, identification on individual basis is possible, and if the postal code is utilized, the user can be recognized on regional basis. From the broadcasting side, the scene information is transmitted to a specific channel or all the channels, together with those user identification information items. On the receiving terminal side, the user identification information thus received is verified against the user identification information stored in its own terminal, and if they agree with each other, the scene notification information is determined as valid information. On the other hand, if they do not agree with each other, that scene notification information is invalidated. As a variation example of the user identification information, it is also possible to include in the scene notification, a script (a processing program) for checking whether or not the user on the receiving terminal has already registered this service, in order to check on the terminal side whether the user is a registered user based on the information stored within the terminal. Anyway, with such a configuration as described above, while receiving a broadcast of a certain program on a certain channel, the scene notification can be made by data broadcasting as to a scene of a program on another channel, only to a specific mobile terminal.

It has been assumed that a desired scene is selected from a prepared menu, but it is also possible to specify a condition by a keyword, or combinations thereof. For example, game results in which a particular team won can be specified as a condition. In this case, in step S13 as shown in FIG. 8, it is checked whether or not each real scene fulfils a condition of each user's desired scene.

In the scene notification screen as shown in FIG. 13(a), if the mobile terminal is provided with broadcast recording capability, an option of TV recording instruction (represented by button on the screen) may be added to the TV-On instruction from the user. With this configuration, if it is difficult to view the scene in real time, the scene can be recorded for later viewing. In this case, it is desirable that the recording is automatically terminated by use of the ending time of the scene.

If the program scene notification service according to the present invention is performed limitedly for a specific channel, the channel is assumed to be fixed. Therefore, it is not necessary to include the channel information into the scene information notified to the terminal. In this instance, when the processing program on the terminal as shown in FIG. 10 to FIG. 12 receives the TV On instruction, the already-known fixed channel is set as a startup channel.

The broadcast receiving/reproducing capability may include a broadcast according to IP broadcast technique, not a broadcast wave. In other words, it may include a function to receive and reproduce the broadcast data from a communication infrastructure of cell phone, without using airwave broadcast. Furthermore, it has been assumed that the broadcast is a TV broadcast, but it is possible to apply the present invention to a radio broadcast and to make a scene notification regarding an audio scene.

It is further possible to charge the user for the service value of the scene notification service. Charging may be carried out in a form of charge by scene, charge by genre of scene, charge on a period basis (for example, per month) without limiting the number of scenes, and a combination thereof. Alternatively, it is also possible to bill a sponsor for the advertisement added to the scene, and a user is not charged.

There has been explained an example that the personal data is added by the authentication server. However, it is also possible to obtain the personal data by checking the sender information with the user registration details on the audience status checking server, without using the authentication server. The registered positional information of the mobile terminal is utilized to obtain the user positional information, but if the mobile terminal has the GPS function, the current position may be detected by the terminal, and the result my be added to the information to be transmitted.

As for the scene notification information received by the short message or E-mail, it is possible to set up a dedicated in-box, and automatically store the scene notification information in this in-box, upon receipt thereof. With this configuration, the scene notification information may not be mixed with other messages, and recognition and management thereof may be performed easier.

In addition, the scene notification information notified by a short message or E-mail is not limited to text information, and it may include information other than the text information, such as image, audio, moving picture, and the like.

INDUSTRIAL APPLICABILITY

The present invention is applicable to a specific service in a mobile terminal, various servers, and a communication system utilizing those elements.

What is claimed is:

1. A broadcast program scene notification method directed to a mobile terminal device having data communication capability and broadcast receiving/reproducing capability, the method comprising the steps of:
   registering desired scene information specifying a desired scene within a broadcast program, the scene being desired by a user at said mobile terminal device, together with communication address information of the mobile terminal device;
   classifying and managing scene information as to a real scene appearing in the broadcast program;
   checking whether or not said real scene corresponds to said desired scene; and
   transmitting to the mobile terminal device of the user, scene information indicating for the user that broadcast of the desired scene is going to start or has started, when said real scene corresponds to said desired scene, wherein
   said scene information includes channel information that indicates a channel over which said real scene is or will be broadcasted,
   the mobile terminal device is configured to use the channel information to receive the broadcast of said real scene, and
   a start of the broadcast program scene is notified substantially in real time.

2. The broadcast program scene notification method according to claim 1, wherein,
   said scene information includes at least one of the followings: title information of the scene to be notified and start time of the scene.

3. The broadcast program scene notification method according to claim 1, wherein,
   transmission of said scene information is performed by any one of the followings: a message communication utilizing a phone number as said communication address information, mail communication utilizing an E-mail address as said communication address information, and data broadcast including user identification information.

4. The broadcast program scene notification method according to claim 1, further comprising a step of adding advertisement information to the scene information to be broadcasted and broadcasting the scene information with the advertisement information, in response to the notification of broadcasting start of said broadcast program scene.

5. The broadcast program scene notification method according to claim 1, wherein,
   advertisement information is transmitted via data communication in accordance with broadcasting the scene, in response to the notification of broadcasting start of said broadcast program scene.

6. A broadcast program scene notification system directed to a mobile terminal device having data communication capability and broadcast receiving/reproducing capability, comprising:
   a registering unit which is connected to said mobile terminal device via a communication network, and registers desired scene information specifying a desired scene of a user within a broadcast program, together with communication address information of the mobile terminal device;
   a managing unit which classifies and manages scene information as to a real scene appearing in a broadcast program; and
   a scene information transmitting unit which checks whether or not said real scene corresponds to said desired scene, and transmits to the mobile terminal device of the user via said communication network, scene information indicating that broadcasting the desired scene is going to start or has started for the user, when said real scene corresponds to said desired scene, wherein
   said scene information includes channel information that indicates a channel over which said real scene is or will be broadcasted,
   the mobile terminal device is configured to use the channel information to receive the broadcast of said real scene, and
   said scene information transmitting unit notifies a start of the broadcast program scene substantially in real time.

7. The broadcast program scene notification system according to claim 6, wherein,
   said scene information includes at least one of the followings: title information of the scene to be notified and start time of the scene.

8. The broadcast program scene notification system according to claim 6, wherein, transmission of said scene information is performed by any one of the followings: a message communication utilizing a phone number as said communication address information, mail communication utilizing an E-mail address as said communication address information, and data broadcast including user identification information.

9. The broadcast program scene notification system according to claim 6, further comprising:
an advertisement information delivery unit which delivers advertisement information by either of broadcasting and data communication; wherein,
said advertisement information delivery unit performs either of the followings: adding the advertisement information to the scene information to be broadcasted and broadcasts the scene information with the advertisement information, in response to the notification of broadcasting start of said broadcast program scene, and delivering the advertisement information to the mobile terminal device via the data communication.

10. The broadcast program scene notification system according to claim 6, wherein,
said registering unit has a user scene correspondence table in which a user on said mobile terminal device is associated with desired scene ID information.

11. The broadcast program scene notification system according to claim 6, wherein,
said management unit has a scene management table in which each real scene is associated with at least corresponding desired scene ID information and scene title information.

12. The broadcast program scene notification system according to claim 6, wherein,
said scene management table further includes channel information and start time information of the program with respect to the real scene.

13. The broadcast program scene notification system according to claim 6, further comprising:
a viewing status checking server which receives from each mobile terminal device, viewing information including at least an information item indicating that broadcast receiving/reproducing capability has been turned on, in response to the notification of said broadcast program scene, and then checks a status of viewing.

14. The broadcast program scene notification system according to claim 13, wherein,
said viewing information further includes, any of the following information items; a point of time when the broadcast receiving/reproducing capability was turned ON, when it was turned OFF, a period of time from ON to OFF, scene information having been notified, channel change information, channel change time, and scene notification opened information.

15. The broadcast program scene notification system according to claim 13, comprising:
an authentication server relaying a transmission of transmission data from said mobile terminal device to said viewing status checking server;
wherein, said authentication server is installed on a cell phone carrier site, and performs a user authentication process based on a terminal ID of the mobile terminal device.

16. The broadcast program scene notification system according to claim 15, wherein,
said authentication server adds to the transmission data, at least one of the following information items; positional information of the mobile terminal device and personal data of the user at the mobile terminal device.

17. A broadcast program scene notification program which makes a broadcast program scene notification to a mobile terminal device having data communication capability and broadcast receiving/reproducing capability, comprising the steps of:
registering desired scene information specifying a desired scene within a broadcast program, the scene being desired by a user at said mobile terminal device, together with communication address information of the mobile terminal device;
classifying and managing scene information as to a real scene appearing in the broadcast program;
checking whether or not said real scene corresponds to said desired scene; and
transmitting to the mobile terminal device of the user, scene information indicating for the user that broadcast of the desired scene is going to start or has started, when said real scene corresponds to said desired scene, wherein
said scene information includes channel information that indicates a channel over which said real scene is or will be broadcasted,
the mobile terminal device is configured to use the channel information to receive the broadcast of said real scene, and
a start of broadcast program scene is notified substantially in real time.

* * * * *